United States Patent
Lin et al.

(10) Patent No.: US 12,045,179 B2
(45) Date of Patent: Jul. 23, 2024

(54) METHOD FOR HANDLING CONFIGURATION DATA FOR AN INTERCONNECTION PROTOCOL WITHIN HIBERNATE OPERATION, CONTROLLER, AND ELECTRONIC DEVICE

(71) Applicant: SK hynix Inc., Icheon-si Gyeonggi-do (KR)

(72) Inventors: Fu Hsiung Lin, Zhubei Hsinchu County (TW); Lan Feng Wang, Zhubei Hsinchu County (TW)

(73) Assignee: SK hynix inc., Icheon-si Gyeonggi-do (KR)

( * ) Notice: Subject to any disclaimer, the term of this patent is extended or adjusted under 35 U.S.C. 154(b) by 0 days.

(21) Appl. No.: 18/116,177

(22) Filed: Mar. 1, 2023

(65) Prior Publication Data
US 2024/0202142 A1   Jun. 20, 2024

(30) Foreign Application Priority Data

Dec. 19, 2022   (TW) .................................. 111148695

(51) Int. Cl.
*G06F 13/10*   (2006.01)
*G06F 9/4401*   (2018.01)
(Continued)

(52) U.S. Cl.
CPC ........ *G06F 13/1668* (2013.01); *G06F 9/4418* (2013.01); *G06F 13/382* (2013.01)

(58) Field of Classification Search
CPC ... G06F 13/1668; G06F 13/382; G06F 9/4488
See application file for complete search history.

(56) References Cited

U.S. PATENT DOCUMENTS 8,621,128 B2   12/2013   Radulescu et al.
8,972,640 B2   3/2015   Wagh
(Continued)

FOREIGN PATENT DOCUMENTS

WO   WO-2011067136 A1 *  6/2011  .......... G06F 13/385

*Primary Examiner* — Cheng Yuan Tseng
(74) *Attorney, Agent, or Firm* — WILLIAM PARK & ASSOCIATES LTD.

(57) ABSTRACT

A method for handling configuration data for an interconnection protocol within hibernation operation, a controller and an electronic device are provided. The method includes the following steps. In an electronic device, a hibernation entering indication signal indicating entering a hibernation state of the interconnection protocol is received. The electronic device has a memory and an index table, wherein the index table includes attribute identifiers corresponding to management information base (MIB) attributes, which belong to sub-layers of a link layer of the interconnection protocol and are required to be retained during hibernation. In response to the hibernation entering indication signal, MIB attribute storing is performed by a hardware protocol engine for implementing the link layer to read, for each one of the sub-layers, attribute data from the sub-layers according to the attribute identifiers from the index table sequentially and to write the attribute data sequentially to the memory. After the entering the hibernation state, the hardware protocol engine is in a power saving state or off while the memory remains on.

26 Claims, 15 Drawing Sheets

(51) Int. Cl.
*G06F 13/16* (2006.01)
*G06F 13/38* (2006.01)

(56) References Cited

U.S. PATENT DOCUMENTS

| | | | |
|---|---|---|---|
| 9,563,260 B2 | 2/2017 | Wagh et al. | |
| 9,684,361 B2 | 6/2017 | Park et al. | |
| 11,061,591 B2* | 7/2021 | Bae | G06F 3/0632 |
| 2015/0134866 A1 | 5/2015 | Ranganathan et al. | |
| 2019/0179540 A1 | 6/2019 | Boenapalli et al. | |
| 2020/0241625 A1* | 7/2020 | Boenapalli | G06F 1/3228 |
| 2021/0216223 A1 | 7/2021 | Noh et al. | |
| 2022/0066689 A1 | 3/2022 | Jung et al. | |
| 2023/0138586 A1* | 5/2023 | Hong | G06F 3/0644 |
| | | | 711/162 |

* cited by examiner

In a first device, receive a hibernation entering indication signal indicating entering a hibernation state of the interconnection protocol, wherein the first device has a memory and an index table, the index table includes attribute identifiers corresponding to a plurality of management information base (MIB) attributes, and the MIB attributes belong to a plurality of sub-layers of a link layer of the interconnection protocol and are required to be retained during hibernation ~S10

In response to the hibernation entering indication signal, perform MIB attribute storing by a hardware protocol engine for implementing the link layer of the interconnection protocol to read, for each one of the sub-layers, attribute data from the one of the sub-layers according to corresponding attribute identifiers from the index table sequentially and to write the attribute data read from the one of the sub-layers sequentially to the memory ~S20

FIG. 4A

| CP_CLK | ⎍⎍⎍⎍~⎍⎍⎍⎍~⎍⎍⎍⎍~⎍⎍⎍⎍~⎍⎍⎍⎍~⎍⎍⎍⎍ | | | | |
|---|---|---|---|---|---|
| MIB attribute data | PA_RD | DL_RD | NT_RD | TP_RD | DME_RD |
| Ret_layer_cnt | 0 ⨯ 1 | 2 | 3 | 4 | 5 |
| Ret_data_cnt | 0 ⨯ 1 to M-1 | 1 to N-1 | 1 to O-1 | 1 to P-1 | 1 to Q-1 |

FIG. 5C

METHOD FOR HANDLING CONFIGURATION DATA FOR AN INTERCONNECTION PROTOCOL WITHIN HIBERNATE OPERATION, CONTROLLER, AND ELECTRONIC DEVICE

CROSS-REFERENCE TO RELATED APPLICATION

This non-provisional application claims priority under 35 U.S.C. § 119(a) on Patent Application No. 111148695 filed in Taiwan, R.O.C. on Dec. 19, 2022, the entire contents of which are hereby incorporated by reference.

BACKGROUND OF THE INVENTION

1. Field of the Invention

The present disclosure relates to an electronic device, and in particular to a method for handling configuration data for an interconnection protocol within hibernation operation, a controller and an electronic device.

2. Description of the Related Art

In current mobile devices (for example, computing devices such as smartphones, tablet computers, multimedia devices and wearable devices), the amounts of data sent and processed are continually increasing, and interconnection interface technologies from one chip to another inside the mobile devices or those affected by the mobile devices need to evolve further, so as to achieve goals of higher transmission speeds, low power consumption operations, expandability, support for multi-tasking and convenient practicability.

To these ends, the Mobile Industry Processor Interface (MIPI) alliance has developed an interconnection interface technology that meets the goals above, for example, the MIPI M-PHY specification associated with a physical layer and the MIPI UniPro specification associated with the Unified Protocol (UniPro). On the other hand, the Joint Electron Device Engineering Council (JEDEC), using the MIPI M-PHY specification and the universal transfer protocol MIPI UniPro specification, has launched a next-generation high-performance non-volatile memory standard that is referred to as Universal Flash Storage (UFS). The UFS realizes gigabit-level high-speed transmissions and low power consumption, and provides the functionality and expandability required for advanced mobile systems to facilitate rapid adoption by the industry.

A system according to the UFS standard includes a computing device and a storage device implemented by a non-volatile memory, wherein the computing device and the storage device respectively serve as a local host and a remote device. Such UFS system needs to support various power states, wherein a hibernate (Hibern8) state (or a UFS Sleep power mode) supports a low power feature such that a power supply can be turned off in the hibernate state. In the UFS standard, the UniPro specification is used to specify the processes to enter and exit the hibernate state. When the UFS system is to enter the hibernate state, since part of the power supply will be turned off, the power mode configurations, or referred to as configuration data, of a host and devices in the UFS system need to be respectively stored before the UFS system enters the hibernate state. When the UFS system is to exit the hibernation state, the configuration data of the host and devices need to be respectively restored before the UFS system exits the hibernate state. During the process of entering or exiting the hibernation state, the process of storing or restoring the configuration data is implementation-specific; that is, the UniPro specification does not specify details of the process of storing or restoring the configuration data.

BRIEF SUMMARY OF THE INVENTION

The present disclosure provides a plurality of embodiments for handling configuration data for an interconnection protocol within hibernate operation and suitable for an electronic device capable of linking to another electronic device according to the interconnection protocol. Thus, in one embodiment, during a process of entering a hibernation state, the electronic device is capable of correctly, efficiently and flexibly storing configuration data, such as a plurality of attribute data, which is required to be retained during hibernation according to an index table. Further, in another embodiment, during a process of exiting the hibernation state, the electronic device is capable of correctly, efficiently and flexibly restoring configuration data retained during hibernation, such as the plurality of attribute data above, according to the index table. The index table has implementation flexibilities; that is, order for storing or restoring different attribute data can be adjusted by way of configuring the index table, and this is beneficial for preventing errors caused by the restoring order of related attribute data.

The present disclosure provides a method for handling configuration data for an interconnection protocol within hibernate operation, suitable for a first device capable of linking to a second device according to the interconnection protocol. The method includes following steps: in the first device, receiving a hibernation entering indication signal indicating entering a hibernation state of the interconnection protocol, wherein the first device has a memory and an index table, the index table includes attribute identifiers corresponding to a plurality of management information base (MIB) attributes, and the MIB attributes belong to sub-layers of a link layer of the interconnection protocol and are required to be retained during hibernation; and in response to the hibernation entering indication signal, performing MIB attribute storing by a hardware protocol engine for implementing the link layer of the interconnection protocol to read, for each one of the sub-layers, attribute data from the one of the sub-layers according to corresponding attribute identifiers from the index table sequentially and to write the attribute data read from the one of the sub-layers sequentially to the memory. The memory is in a first power domain and the hardware protocol engine is in a second power domain independent of the first power domain; and after the hardware protocol engine enters the hibernation state, the second power domain is in a power saving state or off while the first power domain remains on.

The present disclosure provides a controller that is suitable for a first device capable of linking to a second device according to an interconnection protocol. The controller includes a memory, an index table unit, and a hardware protocol engine. The memory is in a first power domain, wherein the first power domain is on in a hibernation state of the interconnection protocol. The index table unit is configured to provide an index table, wherein the index table includes attribute identifiers corresponding to a plurality of management information base (MIB) attributes, and the MIB attributes belong to sub-layers of a link layer of the interconnection protocol and are required to be retained during hibernation. The hardware protocol engine is coupled to the memory, and is for implementing the link layer. In response to a hibernation entering indication signal indicating entering the hibernation state of the interconnection protocol, the hardware protocol engine further performs MIB attribute storing to read, for each one of the sub-layers, attribute data from the one of the sub-layers according to corresponding attribute identifiers from the index table sequentially and to write the attribute data read from the one of the sub-layers sequentially to the memory. The hardware protocol engine is in a second power domain independent of the first power domain; and after the hardware protocol engine enters the hibernation state, the second power domain is in a power saving state or off while the first power domain remains on.

The present disclosure provides an electronic device operable to link to another electronic device according to an interconnection protocol. The electronic device includes an interface circuit, a memory, an index table unit, and a hardware protocol engine. The interface circuit is for implementing a physical layer of the interconnection protocol to link to the another electronic device. The memory is in a first power domain, wherein the first power domain is on in a hibernation state of the interconnection protocol. The index table unit is configured to provide an index table, wherein the index table includes attribute identifiers corresponding to a plurality of management information base (MIB) attributes, and the MIB attributes belong to sub-layers of a link layer of the interconnection protocol and are required to be retained during hibernation. The hardware protocol engine is coupled to the interface circuit, and is for implementing the link layer. In response to a hibernation entering indication signal indicating entering a hibernation state of the interconnection protocol, the hardware protocol engine further performs MIB attribute storing to read, for each one of the sub-layers, attribute data from the one of the sub-layers according to corresponding attribute identifiers from the index table sequentially and to write the attribute data read from the one of the sub-layers sequentially to the memory. The hardware protocol engine is in a second power domain independent of the first power domain; and after the hardware protocol engine enters the hibernation state, the second power domain is in a power saving state or off while the first power domain remains on.

In some embodiments of the above method, controller, or electronic device, the hardware protocol engine further performs the MIB attribute storing by a plurality of operations. The plurality of operations for performing the MIB attribute storing include: for each one of the sub-layers, obtaining each of the attribute identifiers for the one of the sub-layers from the index table; for each of the attribute identifiers for the one of the sub-layers obtained from the index table, reading attribute data from the one of the sub-layers according to the attribute identifier for the one of the sub-layers obtained from the index table, and writing the attribute data read from the one of the sub-layers to the memory.

In some embodiments of the above method, controller, or electronic device, during the MIB attribute storing, after the attribute data is read from the one of the sub-layers according to each of the attribute identifiers for the one of the sub-layers obtained from the index table, the hardware protocol engine further obtains an address signal based on an address count value which is generated according to a read confirm signal issued from the one of the sub-layers and sends the address signal to the memory, wherein the address signal is a corresponding address for writing of next attribute data read from the one of the sub-layers to the memory.

In some embodiments of the above method, controller, or electronic device, in response to a hibernation exiting indication signal indicating exiting the hibernation state of the interconnection protocol, the hardware protocol engine further performs MIB attribute restoring to read, for each one of the sub-layers, attribute data retained in the memory sequentially according to the corresponding attribute identifiers from the index table and to write the attribute data read from the memory sequentially to the one of the sub-layers.

In some embodiments of the above method, controller, or electronic device, the hardware protocol engine further performs the MIB attribute restoring by a plurality of operations. The plurality of operations for performing the MIB attribute restoring include: for each one of the sub-layers, obtaining each of the attribute identifiers for the one of the sub-layers from the index table; for each of the attribute identifiers for the one of the sub-layers obtained from the index table, reading attribute data retained in the memory according to an address signal obtained based on an address count value in response to the attribute identifier for the one of the sub-layers obtained from the index table, and writing the attribute data read from the memory to the one of the sub-layers according to the attribute identifier for the one of the sub-layers obtained from the index table.

In some embodiments of the above method, controller, or electronic device, during the MIB attribute restoring, after the attribute data read from the memory is written to the one of the sub-layers according to each of the corresponding attribute identifiers for the one of the sub-layers obtained from the index table, the hardware protocol engine updates the address count value according to a write confirm signal issued from the one of the sub-layers to obtain an update of the address signal, and sends the update of the address signal to the memory, wherein the update of the address signal is a corresponding address for reading of next attribute data retained in the memory.

In some embodiments of the above method, controller, or electronic device, the attribute identifiers include a first attribute identifier corresponding to Quality of Service (QoS) enable bits and a second attribute identifier corresponding to a QoS counter value; the hardware protocol engine is capable of, during the MIB attribute restoring, making attribute data of the first attribute identifier be restored earlier than attribute data of the second attribute identifier.

In some embodiments of the above method, controller, or electronic device, the index table is configured to be capable of making the attribute data of the first attribute identifier be read from the memory earlier than the attribute data of the second attribute identifier so that the attribute data of the first attribute identifier is restored earlier than the attribute data of the second attribute identifier. In some embodiments of the above method, controller, or electronic device, the link layer is implemented according to Unified Protocol (UniPro); the sub-layers include a physical adapter layer, a data link layer, a network layer, a transport layer, and a device management entity layer; and the device management entity layer is further implemented to perform the MIB attribute storing. Moreover, in some embodiments, the device management entity layer is further implemented to perform the MIB attribute restoring.

In some embodiments of the above method, controller, or electronic device, the interconnection protocol is based on a Universal Flash Storage (UFS) standard.

BRIEF DESCRIPTION OF THE DRAWINGS

FIG. 4A is a schematic flowchart of a method for handling configuration data for an interconnection protocol within hibernate operation according to an embodiment.

FIG. 5C is a schematic timing diagram of the circuit in FIG. 5A or FIG. 5B.

DETAILED DESCRIPTION OF THE INVENTION

To facilitate understanding of the object, characteristics and effects of the present disclosure, embodiments together with the attached drawings for the detailed description of the present disclosure are provided below.

The present disclosure provides a plurality of embodiments for handling a power mode configuration for an interconnection protocol and suitable for an electronic device capable of linking to another electronic device according to the interconnection protocol. Thus, in the process of entering a hibernation state, the electronic device is capable of correctly, efficiently and flexibly storing attribute data that is required to be retained during hibernation according to an index table. In the process of exiting the hibernation state, the electronic device is capable of correctly, efficiently and flexibly restoring the attribute data retained during hibernation according to the index table. The index table has implementation flexibilities; that is, order for storing or restoring different attribute data can be adjusted by way of configuring the index table, and this is beneficial for preventing errors caused by the restoring order of related attribute data.

Figure 1A:
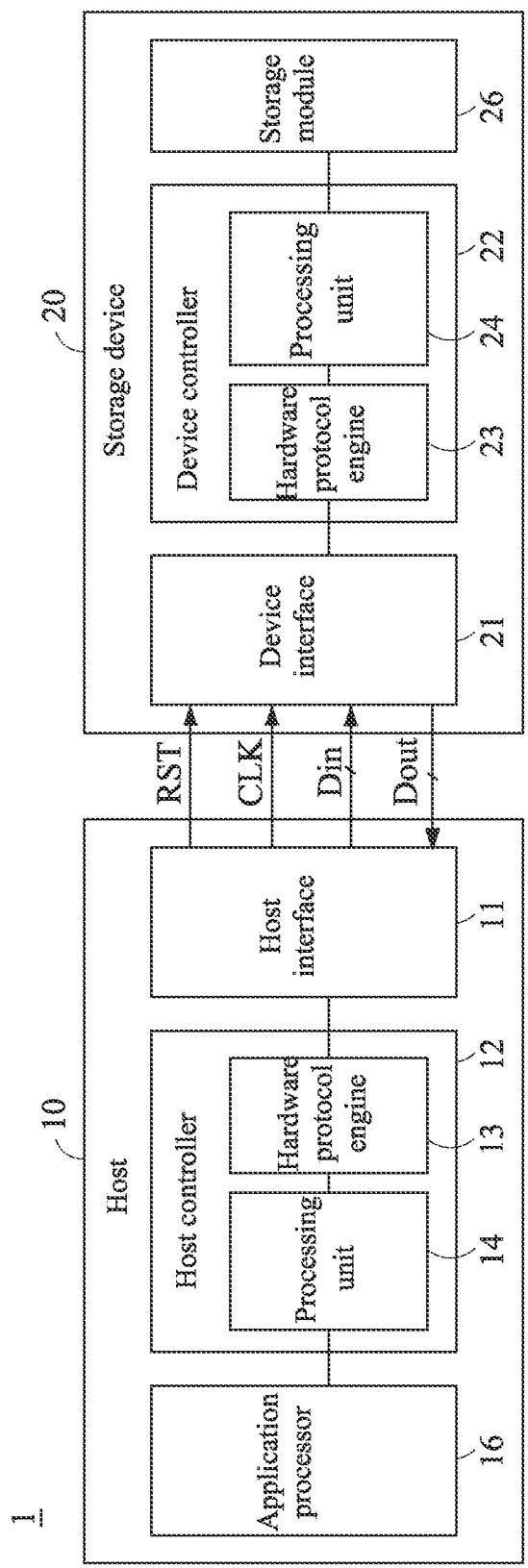
FIG. 1A is a schematic circuit architecture of a storage system according to an embodiment.
Figure 1B:
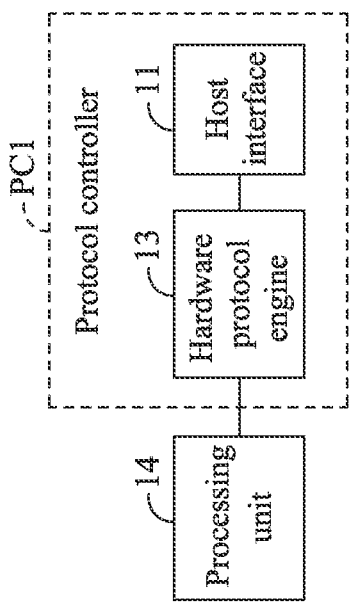
FIG. 1B is a block diagram applicable to a controller for an interconnection protocol in FIG. 1A according to an embodiment.
Figure 1C:
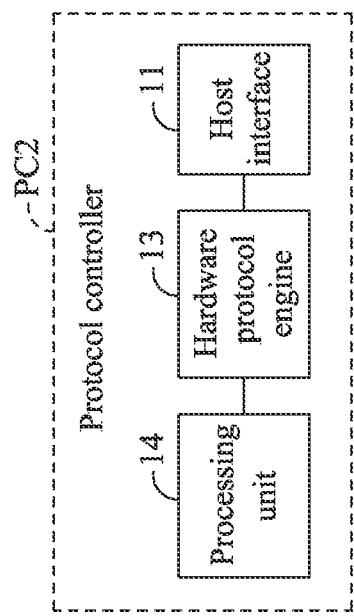
FIG. 1C is a block diagram applicable to the controller for an interconnection protocol in FIG. 1A according to another embodiment.

To better understand and illustrate the various implementations of techniques for handling the power mode configuration for an interconnection protocol, a circuit architecture of a communication system based on interconnection protocol-based is first provided below. Refer to FIG. 1A showing a schematic circuit diagram according to an embodiment. As shown in FIG. 1A, a storage system 1 includes a host 10 and a storage device 20. The host 10 and the storage device 20 communicate with each other through an interconnection protocol, thereby allowing the host 10 to perform data access to the storage device 20. The interconnection protocol is, for example, the Universal Flash Storage (UFS) standard, or other suitable chip-to-chip communication protocols. According to the circuit architecture in FIG. 1A, the foregoing techniques are applicable to a first device (for example, the storage device 20 in FIG. 1A) capable of linking to a second device (for example, the host 10 in FIG. 1A) according to the interconnection protocol, and is also suitable in an application scenario where the first device is the host 10 and the second device is the storage device 20. In the circuit architecture of FIG. 1A, a controller in the host 10 or in the storage device 20 for implementing the interconnection protocol may be implemented by various approaches. As shown in FIG. 1A, the controller (for example, a host controller 12) in the host 10 for implementing the interconnection protocol or the controller (for example, a device controller 22) in the storage device for implementing the interconnection protocol can be implemented as a circuit architecture including a hardware protocol engine and a processing unit, wherein the processing unit of the controller is optional. In another example, as shown in FIG. 1B, the controller in the host 10 for implementing the interconnection protocol, which is referred to as, for example, a protocol controller PC1, can be implemented to include a host interface 11 and a hardware protocol engine 13 and be implemented as a single chip, wherein a processing unit 14 may be regarded as an external circuit of the protocol controller PC1. Moreover, similarly, the controller (or referred to as a protocol controller of the storage device 20) in the storage device 20 for implementing the interconnection protocol can be implemented to include a device interface 21 and a hardware protocol engine 23 and be implemented as a single chip, wherein a processing unit 24 may be regarded as an external circuit of the protocol controller. For another example, as shown in FIG. 1C, the controller in the host 10 for implementing the interconnection protocol, for example, a protocol controller PC2, can be implemented to include the host interface 11, the hardware protocol engine 13, and the processing unit 14, and be implemented as a single chip. Moreover, similarly, the controller (or referred to as a protocol controller of the storage device 20) in the storage device 20 for implementing the interconnection protocol can be implemented to include the device interface 21, the hardware protocol engine 23, and the processing unit 24, and be implemented as a single chip. Thus, according to the circuit architecture in FIG. 1A, the controller in the host 10 or the storage device 20 for implementing the interconnection protocol can be regarded as comprising or representing the embodiment based on FIG. 1A, FIG. 1B or FIG. 1C. The description of other examples related to FIG. 1A below is also suitable for the embodiments based on FIG. 1A, FIG. 1B or FIG. 1C.

The circuit architecture shown in FIG. 1A has sufficient flexibilities and can be efficiently implemented to meet requirements for different products, so as to adapt to diversified designs of manufacturers for better product development. The host 10 is, for example, a computing device such as a smartphone, a tablet computer or a multimedia device. The storage device 20 is, for example, a storage device inside or outside the computing device, and is such as a storage device based on a non-volatile memory. The storage device 20 can write data under control of the host 10 or provide written data to the host 10. The storage device 20 can be implemented as a solid stage drive (SSD), a multimedia card (MMC), an embedded Multimedia card (eMMC), a Secure Digital (SD) card, or a UFS device; however, the implementation of the present disclosure is not limited to the examples above.

The host 10 includes the host interface 11, the host controller 12, and an application processor 16.

The host interface 11 implements a physical layer of the interconnection protocol so as to link to the storage device 20. For example, the host interface 11 implements a physical (M-PHY) layer of the UFS standard.

The host controller 12 is coupled between the host interface 11 and the application processor 16. When the application processor 16 needs to perform data access to the storage device 20, it sends a corresponding access operation command or write data to the host controller 12 and communicates with the storage device 20 through the interconnection protocol, thereby completing data access to the storage device 20.

The host controller 12 includes, for example, the hardware protocol engine 13 and the processing unit 14, wherein the processing unit 14 is optional.

The hardware protocol engine 13 implements a link layer of the interconnection protocol. Taking the UFS standard as the interconnection protocol for example, the link layer is a Unified Protocol (UniPro) layer. The hardware protocol engine 13 communicates with the host interface 11 and the processing unit 14 and performs data conversion according to the specification of the link layer.

The processing unit 14 is coupled to the hardware protocol engine 13, and communicates with the application processor 16. The processing unit 14 can execute one or more pieces of firmware. For example, an access operation command or write data sent by an operating system, a driver, or an application executed by the application processor 16 is converted into data compliant with a command format of the link layer of the interconnection protocol by the firmware executed by the processing unit 14, and is then sent to the hardware protocol engine 13 for processing according to the specification of the link layer. Or conversely, read data returned by the storage device 20 in response to a read command of the host 10 is sent back to the hardware protocol engine 13 according to the specification of the link layer of the interconnection protocol, and is converted by the corresponding firmware executed by the processing unit 14 into data compliant with a format readable by the operating system, driver, or application executed by the application processor 16. The firmware can be stored, for example, in an internal memory of the processing unit 14, or be stored in an internal memory of the host controller 12, wherein the internal memory can include a volatile memory and a non-volatile memory. The processing unit 14 is optional; that is, the task of the firmware above may be implemented by way of hardware at the hardware protocol engine 13.

The storage device 20 includes the device interface 21, the device controller 22, and a storage module 26.

The device interface 21 is for implementing a physical layer of the interconnection protocol so as to link to the host 10. For example, the device interface 21 is for implementing a physical (M-PHY) layer of the UFS standard.

The device controller 22 is coupled between the device interface 21 and the storage module 26. The device controller 22 fundamentally has functions corresponding to those of the host controller 12 described above. When the host 10 issues and sends an access operation command or write data to the storage device 20 through the interconnection protocol, the device controller 22 converts data received through the interconnection protocol into a corresponding access operation command or write data for the storage module 26 so as to facilitate data access to be performed by the storage module 26. Or conversely, the device controller 22 sends, according to the specification of the link layer of the interconnection protocol, read data returned by the storage device 20 in response to the read command of the host 10 back to the host 10. The storage module 26 includes, for example, a memory chip of one or more non-volatile memories, and is, for example, a flash memory chip. To this end, in one example, the storage device 20 may be further provided with a flash memory controller. The flash memory controller is coupled between the device controller 22 and the storage module 26, and can be implemented to control write, read, or erase operations of the storage module 26, and is capable of exchanging data with the storage module 26 through an address bus or a data bus. In another example, the device controller 22 may be further equipped with the flash memory controller.

The device controller 22 includes the hardware protocol engine 23 and the processing unit 24, wherein the processing unit 24 is optional.

The hardware protocol engine 23 implements a link layer of the interconnection protocol. Taking the UFS standard as the interconnection protocol for example, the link layer is a UniPro layer. The hardware protocol engine 23 communicates with the device interface 21 and the processing unit 24 and performs data conversion according to the specification of the link layer.

The processing unit 24 is coupled to the hardware protocol engine 23, and communicates with the host 10 through the device interface 21. The processing unit 24 can execute one or more pieces of firmware. For example, the processing unit 24 executes one or more pieces of firmware to communicate with the above flash memory controller, so as to exchange information such as an access operation command, write data, or read data between the interconnection protocol and the flash memory controller. The firmware can be stored, for example, in an internal memory of the processing unit 24, an internal memory of the device controller 22, or a specific storage region of the storage module 26, wherein the internal memory may include a volatile memory and a non-volatile memory.

As shown in FIG. 1A, the host interface 11 can be coupled to the device interface 21 through data lines Din and Dout for transmitting or receiving data, a reset line RST for transmitting a hardware reset signal and a clock line CLK for transmitting data. The data lines Din and Dout can be implemented in a plurality of pairs, wherein one pair of data lines Din or one pair of data lines Dout can be referred to as a lane. The host interface 11 can communicate with the device interface 21 by using at least one interface protocol, which is, for example, the MIPI, UFS, Small Computer System Interface (SCSI) or Serial Attached SCSI (SAS); however, the implementation of the present disclosure is not limited to the examples above. Under the UFS standard, the host 10 and the storage device 20 can be implemented with a plurality of lanes in between to improve transmission efficiency, wherein either of the directions from the host 10 to the storage device 20 or from the storage device 20 to the host 10 can support two lanes at most, and the plurality of lanes can be selectively set to be active or inactive.

Details are provided by taking the UFS standard as the interconnection protocol for example. The UFS standard includes a UFS command set (USC) layer, a UFS transport (UTP) layer, and a UFS interconnect (UIC) layer. The UIC layer includes a link layer and a physical layer. The link layer of the UIC layer is defined according to the UniPro specification, and the physical layer of the UIC layer is defined according to the M-PHY specification.

Figure 2:
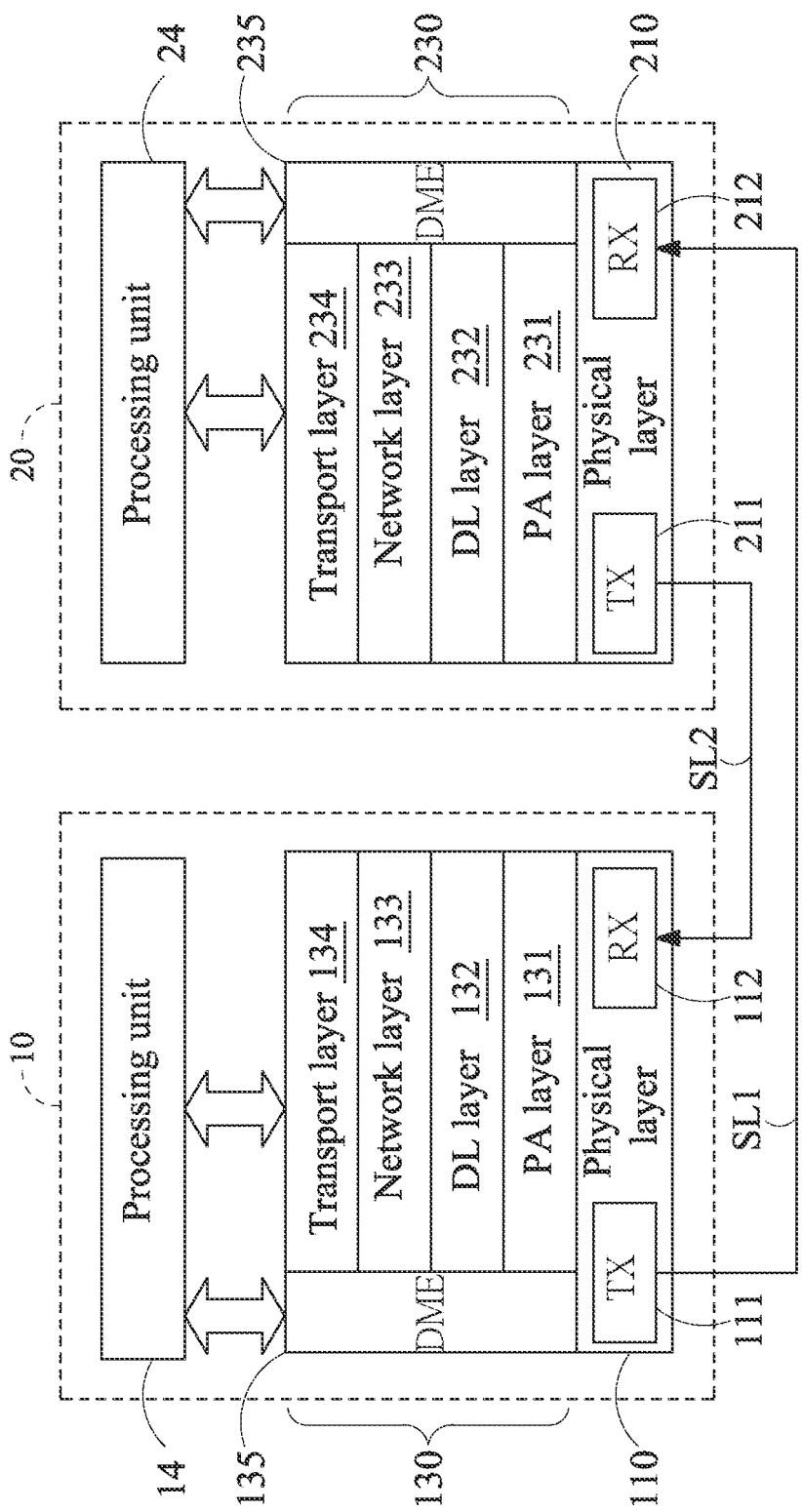
FIG. 2 is a schematic diagram of a layered architecture of the storage system in FIG. 1A according to the UFS standard.

Refer to FIG. 2 showing a schematic diagram of a layered architecture of the storage system in FIG. 1A according to the UFS standard. Because the UFS standard is based on the MIPI UniPro layer and the MIPI M-PHY layer, the host interface 11 and the hardware protocol engine 13 of the host 10 shown in FIG. 1A are respectively used for implementing a physical layer 110 and a UniPro layer 130 in FIG. 2, and the device interface 21 and the hardware protocol engine 23 of the storage device 20 in FIG. 1A are respectively used for implementing a physical layer 210 and a UniPro layer 230 in FIG. 2.

As shown in FIG. 2, the UniPro layer 130 (or 230) can include a PHY adapter (PA) layer 131 (or 231), a data link (DL) layer 132 (or 232), a network layer 133 (or 233), and a transport layer 134 (or 234). The layers in the UniPro layer 230 of the storage device 20 can also similarly operate and be implemented.

The PHY adapter layer (131 or 231) couples the physical layer (110 or 210) to the data link layer (132 or 232). The PHY adapter layer (131 or 231) is capable of performing bandwidth control and power consumption management between the physical layer (110 or 210) and the data link layer (132 or 232). In practice, the physical layer 110 of the host 10 includes a transmitter (TX) 111 and a receiver (RX) 112, and the physical layer 210 of the storage device 20 includes a transmitter (TX) 211 and a receiver (RX) 212, thereby establishing data lanes SL1 and SL2 to perform full duplex communication. The UniPro specification supports a plurality of data lanes for a link in each transmission direction (for example, forward or backward).

The data link layer (132 or 232) is capable of performing flow control of data transmission between the host 10 and the storage device 20. That is, the data link layer (132 or 232) can monitor data transmission or control a data transmission rate. Moreover, the data link layer (132 or 232) can perform cyclic redundancy check (CRC)-based error control. The data link layer (132 or 232) can use packets received from the network layer (133 or 233) to generate frames, or can use frames received from the PHY adapter layer (131 or 231) to generate packets.

The network layer (133 or 233) is used for a routing function for selecting a transmission path for the packets received from the transport layer (134 or 234).

The transport layer (134 or 234) can use a command received from the UFS application layer to configure a data segment suitable for the protocol and transmit the data segment to the network layer (133 or 233), or can extract a command from packets received from the network layer (133 or 233) and transmit the command to the UFS application layer. The transport layer (134 or 234) can use a sequence-based error control scheme to ensure validity of data transmission.

Moreover, a device management entity (DME) (135 or 235) is further defined in the UniPro layer (130 or 230), which can communicate with the layers in the physical layer (110 or 210) and the UniPro layer (130 or 230), for example, the PHY adapter layer (131 or 231), the data link layer (132 or 232), the network layer (133 or 233), and the transport layer (134 or 234), so as to communicate with the UFS application layer, thereby implementing unified protocol (UniPro) overall functions such as control or configuration functions including power-on, power-off, reset, and power mode change.

Figure 3:
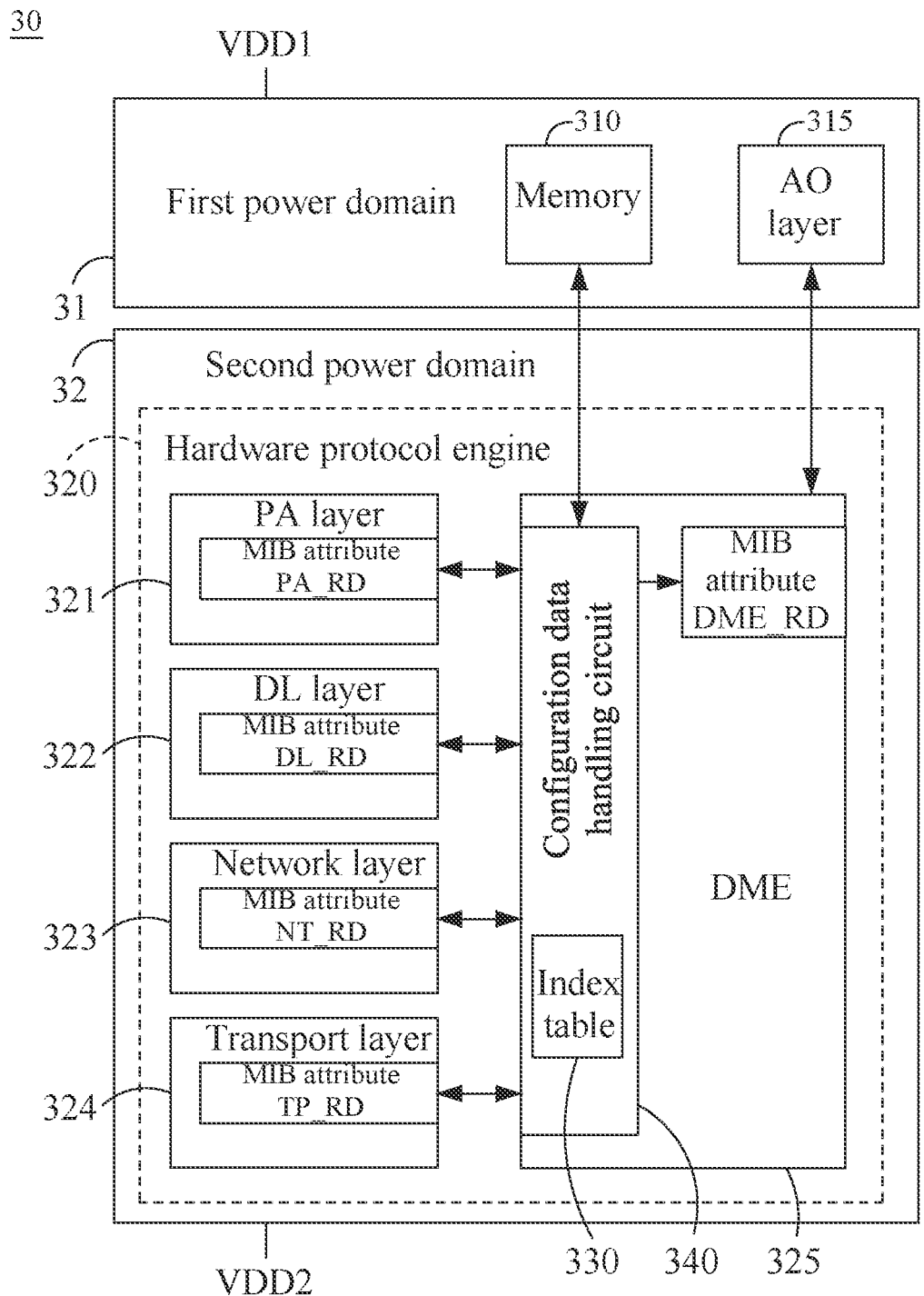
FIG. 3 is a block diagram of a circuit architecture for handling configuration data for an interconnection protocol within hibernate operation according to an embodiment.

Various implementations for handling configuration data for an interconnection protocol within hibernate operation are provided below. The description is given with the assistance of the communication system of an interconnection protocol in FIG. 1A to FIG. 1C and the layered architecture based on the UFS standard in FIG. 2. Referring to FIG. 3, a block diagram of a circuit architecture for handling configuration data for an interconnection protocol within hibernate operation is illustrated according to an embodiment. As shown in FIG. 3, a circuit 30 is used for handling configuration data for an interconnection protocol with hibernate operation, for example, for retaining configuration data when entering a hibernation state of the interconnection protocol, and may be further used for restoring configuration data when exiting the hibernation state.

In FIG. 3, the circuit 30 represents an circuit architecture and may cover various circuit implementations. The circuit 30 is, for example, implemented in an electronic device compliant with an interconnection protocol, such as in the host 10 or the storage device 20 in FIG. 1A, or implemented in a controller for implementing the interconnection protocol, such as a controller (12 or 22 in FIG. 1A; or PC1 in FIG. 1B, PC2 in FIG. 1C, and related embodiments) for implementing the interconnection protocol in the host 10 or the storage device 20 in FIG. 1A. The circuit 30 includes a first power domain 31 and a second power domain 32. The first power domain 31 is independent of the second power domain 32. After entering the hibernation state according to the interconnection protocol, the second power domain 32 is in a power saving state or off while the first power domain 31 remains on.

The first power domain 31 represents a set of circuits that use a first power supply voltage (VDD1) as a power supply voltage. The first power domain 31 is on in a hibernation state of the interconnection protocol, and as long as the first power supply voltage (VDD1) is supplied to the first power domain 31 in an application scenario, circuits corresponding to the first power domain 31 are persistently powered (or referred to as "always-on" (AO)). Thus, for example, in the first power domain 31, an auxiliary element or circuit for handling configuration data for the interconnection protocol within hibernation operation, for example, a memory 310, may be included. In some examples, in the first power domain 31, an always-on (AO) layer 315 may be further implemented so as to implement an application layer of the interconnection protocol or other required operations.

The second power domain 32 represents another set of circuits that use a second power supply voltage (VDD2) as a power supply voltage. For example, in the second power domain 32, a circuit for implementing a link layer of the interconnection protocol, for example, a hardware protocol engine 320, can be included. The hardware protocol engine 320, for example, implements a plurality of sub-layers of the link layer of the interconnection protocol, and the sub-layers include a PHY adapter (PA) layer 321, a data link (DL) layer 322, a network layer 323, a transport layer 324 and a device management entity (DME) 325, wherein the device management entity may be further regarded as a sub-layer of the link layer and may thus be referred to as a device management entity (DME) layer below. After entering the hibernation state according to the interconnection protocol, the second power domain 32 can be configured to be in a power saving state or off while the first power domain 31 remains always-on. For example, after entering the hibernation state, supplying of the second power supply voltage (VDD2) may be stopped, or a corresponding circuit in the second power domain 32 for receiving and distributing the second power supply voltage (VDD2) stops distributing the second power supply voltage (VDD2) to a portion or all of the remaining circuits in the second power domain 32, such that the second power domain 32 is in a power saving state or off. The hardware protocol engine 320 is an implementation of the above hardware protocol engine 13 of the host 10 or the hardware protocol engine 23 of the storage device 20 and related embodiments. For example, in addition to being implemented according to the UniPro specification adopted by the UFS standard, the hardware protocol engine 320 may be further implemented as the circuit architecture according to FIG. 3 so as to implement management information base (MIB) attribute storing after entering the hibernation state, or to further implement MIB attribute restoring after exiting the hibernation state.

In FIG. 3, for the sake of illustration, the first power supply voltage (VDD1) and the second power supply voltage (VDD2) are used as representative examples. In some other examples based on FIG. 3, the first power domain 31 may have a plurality of power supply voltages of the same or different magnitude, and the second power domain 32 may similarly have a plurality of power supply voltages of the same or different magnitude, so as to satisfy requirements of specific circuits, modules, and elements that need to be implemented in the individual power domains. Regardless of the number of power supply voltages in each power domain, the first power domain 31 is independent of the second power domain 32, and after entering the hibernation state according to the interconnection protocol, the second power domain 32 is in a power saving state or off while the first power domain 31 remains on.

Refer to FIG. 4A showing a schematic flowchart of a method for handling configuration data for an interconnection protocol within hibernate operation according to an embodiment. The method is suitable for use in a first device capable of linking to a second device according to the interconnection protocol. The method includes steps S10 and S20 below.

In step S10, the first device receives a hibernation entering indication signal indicating entering a hibernation state of the interconnection protocol, wherein the first device includes a memory (for example, the memory 310 in FIG. 3) and an index table (for example, an index table 330 in FIG. 3) to be used when entering the hibernation state. The memory is in a first power domain (for example, 31 in FIG. 3), wherein the first power domain is on in a hibernation state of the interconnection protocol. The index table includes attribute identifiers corresponding to a plurality of management information base (MIB) attributes, and the MIB attributes belong to a plurality of sub-layers (for example, 321 to 325 in FIG. 3) of a link layer of the interconnection protocol and are required to be retained during hibernation.

In step S20, in response to the hibernation entering indication signal, MIB attribute storing is performed by a hardware protocol engine (for example, 320 in FIG. 3) for implementing the link layer to read, for each one (for example, each one of the 321 to 325 in FIG. 3) of the sub-layers, attribute data from the one of the sub-layers according to corresponding attribute identifiers from the index table (for example, the index table 330 in FIG. 3) sequentially and to write the attribute data read from the one of the sub-layers sequentially to the memory (for example, the memory 310 in FIG. 3). The hardware protocol engine (for example, 320 in FIG. 3) is in a second power domain (for example, 32 in FIG. 3) independent of the first power domain (for example, 31 in FIG. 3), and after the hardware protocol engine enters the hibernation state, the second power domain is in a power saving state or off while the first power domain remains on.

Thus, in the embodiment in FIG. 4A, during a process of entering a hibernation state, the electronic device is capable of correctly, efficiently and flexibly storing attribute data that is required to be retained during hibernation according to the index table.

In one example, the memory is a circuit implemented by using appropriate memories such as a volatile memory, a non-volatile memory, or registers. For example, the memory 310 in FIG. 3 is in the first power domain 31, and is suitable for storing a plurality of MIB attributes that are required to be retained during hibernation in the link layer since the first power domain 31 is on in a hibernation state of the interconnection protocol. (today)

In addition, in the UniPro specification adopted by the UFS standard, an attribute is defined for a certain function or operation, and the attribute is assigned with a corresponding attribute identifier (ID) and correspondingly has a certain value within a predetermined value range, wherein the value can be read or set and is broadly referred to as attribute data of this attribute in the present disclosure. The MIB attributes that are required to be retained during hibernation indicate that the attributed data corresponding to the attribute identifiers for the attributes is required to be retained when entering a hibernation state. After exiting the hibernation state, the attribute data retained during hibernation is required to be restored; that is, the retained attribute data needs to be written to corresponding storage addresses in the respective sub-layers.

In one example, as shown in FIG. 3, for the sake of illustration, some MIB attributes that are required to be respectively retained during hibernation exist in the individual sub-layers; MIB attributes PA_RD, DL_RD, NT_RD, TP_RD, and DME_RD represent data of a plurality of MIB attributes that are required to be retained (or to be referred to as MIB attribute data to be retained) during hibernation in the PHY adapter layer 321, the data link layer 322, the network layer 323, the transport layer 324, and the device management entity 325, respectively. For example, the link layer is implemented according to the UniPro specification, and the UniPro specification defines a plurality of MIB attributes for each sub-layer with corresponding attribute identifiers (ID) and corresponding values, wherein some MIB attributes are additionally marked as required to be retained during hibernation. For example, in the data link (DL) layer, a plurality of MIB attributes (MIB attributes DL_RD) that are required to be retained during hibernation include DL_FC0ProtectionTimeOutVal (attribute identifier: 0x2041; value range: 0 to 1023), DL_TC0ReplayTimeOutVal (attribute identifier: 0x2042; value range: 0 to 4095), and DL_AFC0ReqTimeOutVal (attribute identifier: 0x2043; value range: 0 to 4095).

In some embodiments, as the index table 330 shown in FIG. 3, the index table 330 may be implemented by way of various circuits in the circuit 30. TABLE 1 shows an example of a plurality of MIB attributes that are required to be retained during hibernation in the sub-layers, and the index table 330 can be implemented to include the attribute identifiers of the plurality of MIB attributes that are required to be retained during hibernation in the sub-layers in TABLE 1. In practice, a circuit designer may flexibly makes a specific configuration for order of the sub-layers or order of the attribute identifiers to implement the index table 330, so as to comply with specification requirements of the interconnection protocol and also facilitate circuit implementation. For example, the index table 330 can also be implemented as a two-dimensional look-up table that records codes of the sub-layers and the corresponding attribute identifiers of the sub-layers, so as to facilitate looking up the corresponding attribute identifiers of the sub-layers from the index table 330.

TABLE 1

| Sub-layer | Attribute identifier | MIB attribute (required to be retained during hibernation) |
|---|---|---|
| Data link layer | 0 × 2040 | DL_TC0TXFCThreshold |
|  | 0 × 2041 | DL_FC0Protection TimeOutVal |
|  | . . . | . . . |
| Network layer | 0 × 3000 | N_DeviceID |
|  | 0 × 3001 | N_DeviceID_valid |
|  | . . . | . . . |
| Device management entity (DME) | 0 × 5000 | DME_DDBL1_Revision |
|  | 0 × 5001 | DME_DDBL1_Level |
|  | . . . | . . . |

The examples of the MIB attributes (such as DL_TC0TXFCThreshold and DME_DDBL1_Revision) in TABLE 1 are required to be retained during hibernation, as specified by the UniPro specification. Associated details can be referred to the description in the UniPro specification, and will not be repeated herein for the sake of brevity. Moreover, in one embodiment, the index table 330 may further include a plurality of MIB attributes that are required to be retained during hibernation such as being self-defined by a developer but not defined in the interconnection protocol, in addition to including a plurality of MIB attributes required to be retained during hibernation according to the interconnection protocol.

In one embodiment of step S20, the hardware protocol engine 320 in FIG. 3 may be implemented to perform the operation of step S20 according to the index table 330. In addition to implementing the device management entity 325 in the hardware protocol engine 320 according to the UniPro specification adopted by the USF standard, the device management entity 325 is further implemented to perform step S20. For example, in FIG. 3, the device management entity 325 includes a configuration data handling circuit 340 for implementing step S20, wherein the index table 330 may be implemented in the configuration data handling circuit 340. Optionally, the index table 330 may also be implemented outside the configuration data handling circuit 340.

Figure 4B:
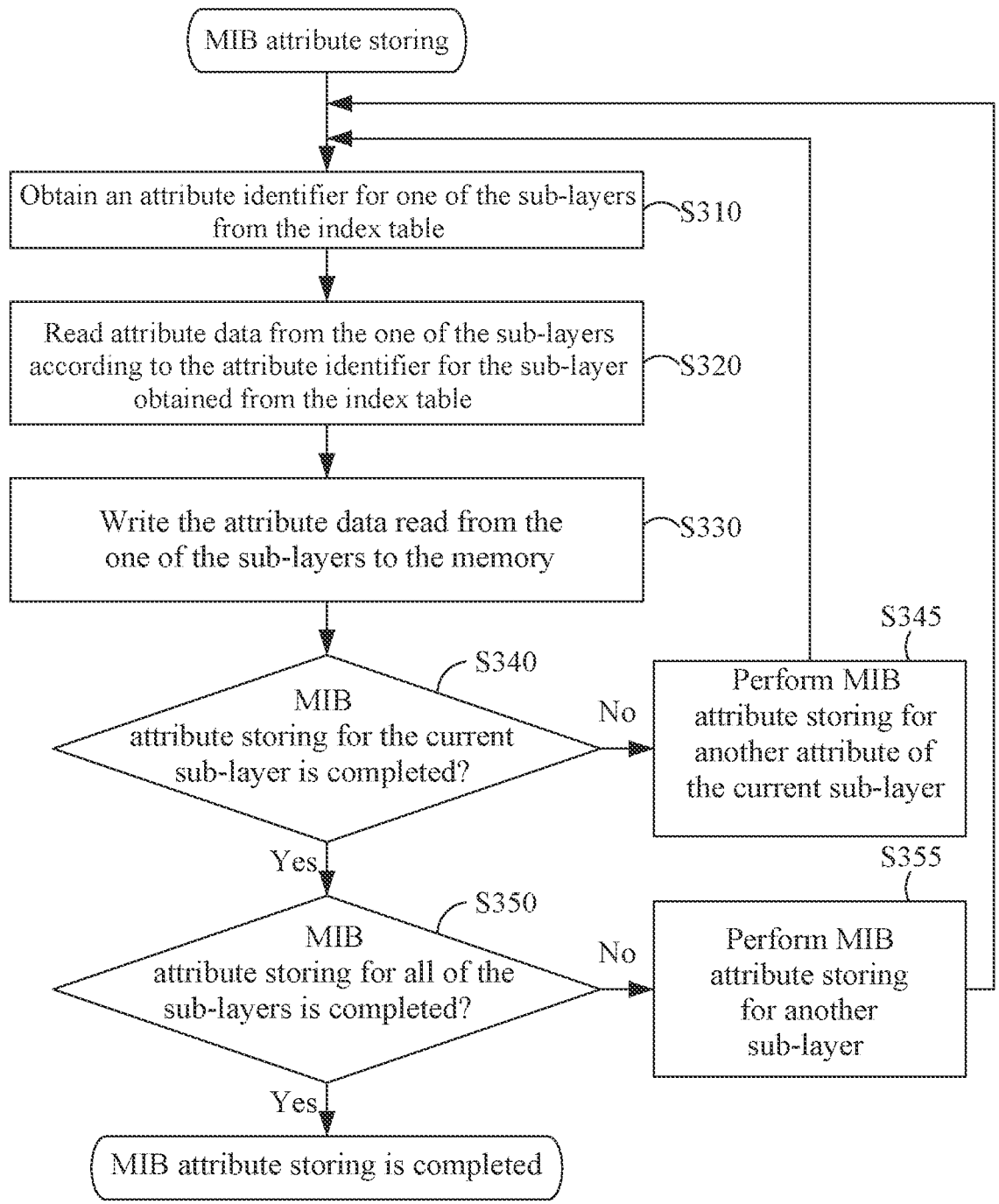
FIG. 4B is a schematic flowchart of MIB attribute storing of step S20 in FIG. 4A according to an embodiment.

Refer to FIG. 4B showing a schematic flowchart of MIB attribute storing of step S20 in FIG. 4A according to an embodiment. An embodiment of step S20 may include steps S310 to S355. Accordingly, the hardware protocol engine 320 may be further implemented to perform steps S310 to S355 so as to implement MIB attribute storing.

In step S310, the hardware protocol engine 320 obtains an attribute identifier for one of the sub-layers from the index table (for example, 330 in FIG. 3).

In step S320, attribute data is read from the one of the sub-layers according to the attribute identifier for the sub-layer obtained from the index table.

In step S330, the hardware protocol engine 320 writes the attribute data read from the one of the sub-layers to the memory (for example, 310 in FIG. 3). For example, in response to the attribute identifier for the sub-layer obtained from the index table, the hardware protocol engine 320 writes the attribute data read from the one of the sub-layers to the memory (for example, 310 in FIG. 3) according to an address signal obtained based on an address count value. For example, the address count value is generated by an address counter. Moreover, the address signal may be directly obtained by using the address count value (or be referred to as the address count value), or the address signal may be obtained by a mapping relation according to the address count value.

In step S340, the hardware protocol engine 320 determines whether MIB attribute storing for the current sub-layer is completed. If so, step S350 is performed; if not, step S345 is performed to perform MIB attribute storing for another attribute of the current sub-layer, and thus steps S310 to S340 are repeated for another attribute of the current sub-layer.

In step S350, the hardware protocol engine 320 determines whether MIB attribute storing for all of the sub-layers is completed. If so, the MIB attribute storing for all of the sub-layers is completed, and so other steps or operations can be performed, depending on implementation requirements; if not, step S355 is performed to perform MIB attribute storing for another sub-layer, and thus steps S310 to S350 are repeated for another sub-layer until the MIB attribute storing for all of the sub-layers is completed.

In one embodiment, the hardware protocol engine 320 in FIG. 3 may implement step S20 according to FIG. 4B in the order from the PHY adapter layer 321, the data link layer 322, the network layer 323, the transport layer 324 to the device management entity 325, so as to complete the MIB attribute storing. In some other embodiments, the sub-layers may be arranged in various sequences, whenever appropriate, to complete the MIB attribute storing. To carry out the MIB attribute storing, the order of the sub-layers may be achieved by way of configuring the index table 330, or may be achieved by way of implementing the configuration data handling circuit 340.

Figure 4C:
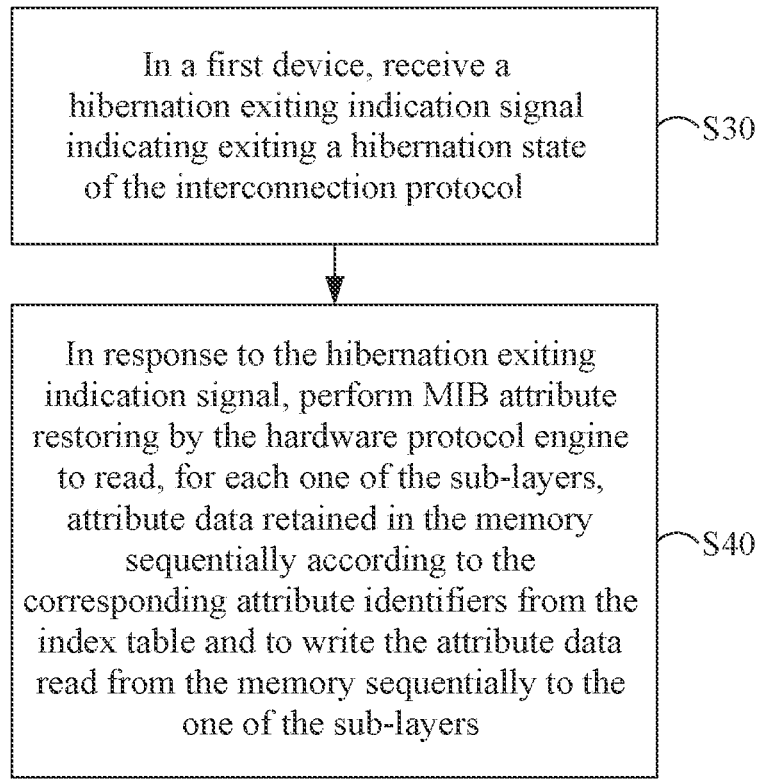
FIG. 4C is a schematic flowchart of a method for handling configuration data for an interconnection protocol within hibernate operation according to an embodiment.

Refer to FIG. 4C showing a schematic flowchart of a method for handling configuration data for an interconnection protocol within hibernate operation according to an embodiment. In this embodiment, the method in FIG. 4A may further include steps S30 and S40 shown in FIG. 4D.

In step S30, in the first device, a hibernation exiting indication signal indicating exiting the hibernation state of the interconnection protocol is received.

In step S40, in response to the hibernation exiting indication signal, MIB attribute restoring is performed by the hardware protocol engine (for example, 320 in FIG. 3) to read, for each one of the sub-layers (for example, each of 321 to 325 in FIG. 3), attribute data retained in the memory (for example, 310 in FIG. 3) sequentially according to the corresponding attribute identifiers from the index table (for example, 330 in FIG. 3) and to write the attribute data read from the memory sequentially to the one of the sub-layers. Accordingly, the hardware protocol engine 320 may be further implemented to perform step S40 so as to implement MIB attribute restoring.

Figure 4D:
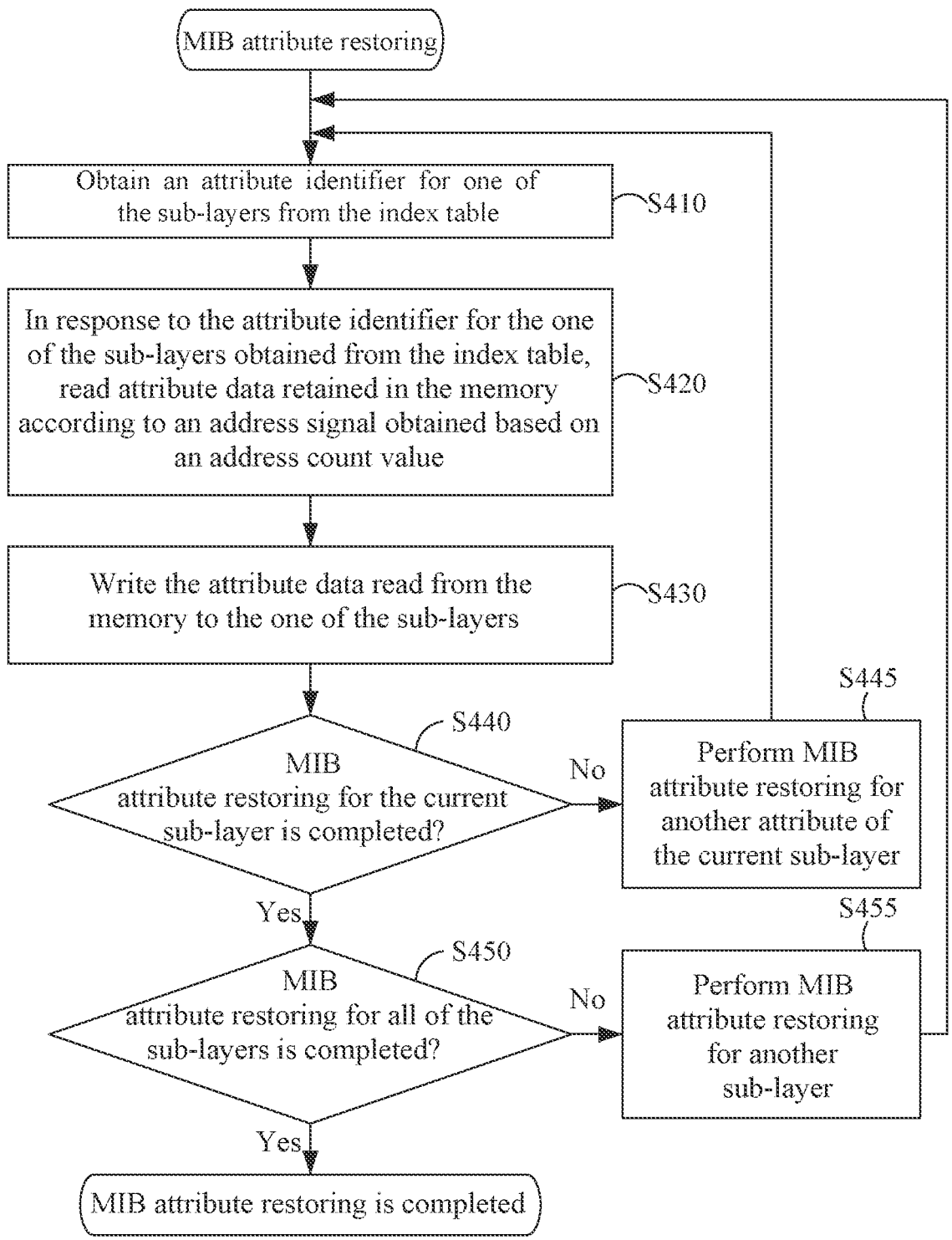
FIG. 4D is a schematic flowchart of MIB attribute restoring of step S40 in FIG. 4C according to an embodiment.

Refer to FIG. 4D showing a schematic flowchart of MIB attribute restoring of step S40 in FIG. 4C according to an embodiment. One embodiment of step S40 may include steps S410 to S455. Accordingly, the hardware protocol engine 320 may be further implemented to perform steps S410 to S455 so as to implement MIB attribute restoring.

In step S410, the hardware protocol engine 320 obtains an attribute identifier for one of the sub-layers from the index table (for example, 330 in FIG. 3).

In step S420, the hardware protocol engine 320 reads attribute data retained in the memory (for example, 310 in FIG. 3) according to an address signal obtained based on an address count value in response to the attribute identifier for the one of the sub-layers obtained from the index table. For example, the address count value is generated by an address counter. Moreover, the address signal can be directly obtained by using the address count value (or be referred to as the address count value), or the address signal may be obtained by a mapping relation according to the address count value.

In step S430, the hardware protocol engine 320 writes the attribute data read from the memory to the one of the sub-layers.

In step S440, the hardware protocol engine 320 determines whether MIB attribute restoring for the current sub-layer is completed. If so, step S450 is performed; if not, step S445 is performed to perform MIB attribute restoring for another attribute of the current sub-layer, and thus steps S410 to S440 are repeated for another attribute of the current sub-layer.

In step S450, the hardware protocol engine 320 determines whether MIB attribute restoring for all of the sub-layers is completed. If so, the MIB attribute restoring for all of the sub-layers is completed, and so other steps or operations can be performed, depending on implementation requirements; if not, step S455 is performed to perform MIB attribute restoring for another sub-layer, and thus steps S410 to S450 are repeated for another sub-layer until the MIB attribute restoring for all of the sub-layers is completed.

In one embodiment, the hardware protocol engine 320 in FIG. 3 may implement step S40 according to FIG. 4D in the order from the PHY adapter layer 321, the data link layer 322, the network layer 323, the transport layer 324 to the device management entity 325, so as to complete the MIB attribute restoring; that is, completing the MIB attribute restoring in the same order of sub-layers as that of the above corresponding embodiment of MIB attribute storing. In some other embodiments, the sub-layers may be arranged in other orders, whenever appropriate, to complete the MIB attribute restoring. To carry out the MIB attribute restoring, the order of the sub-layers may be achieved by way of configuring the index table 330, or may be achieved by way of implementing the configuration data handling circuit 340.

Figure 5A:
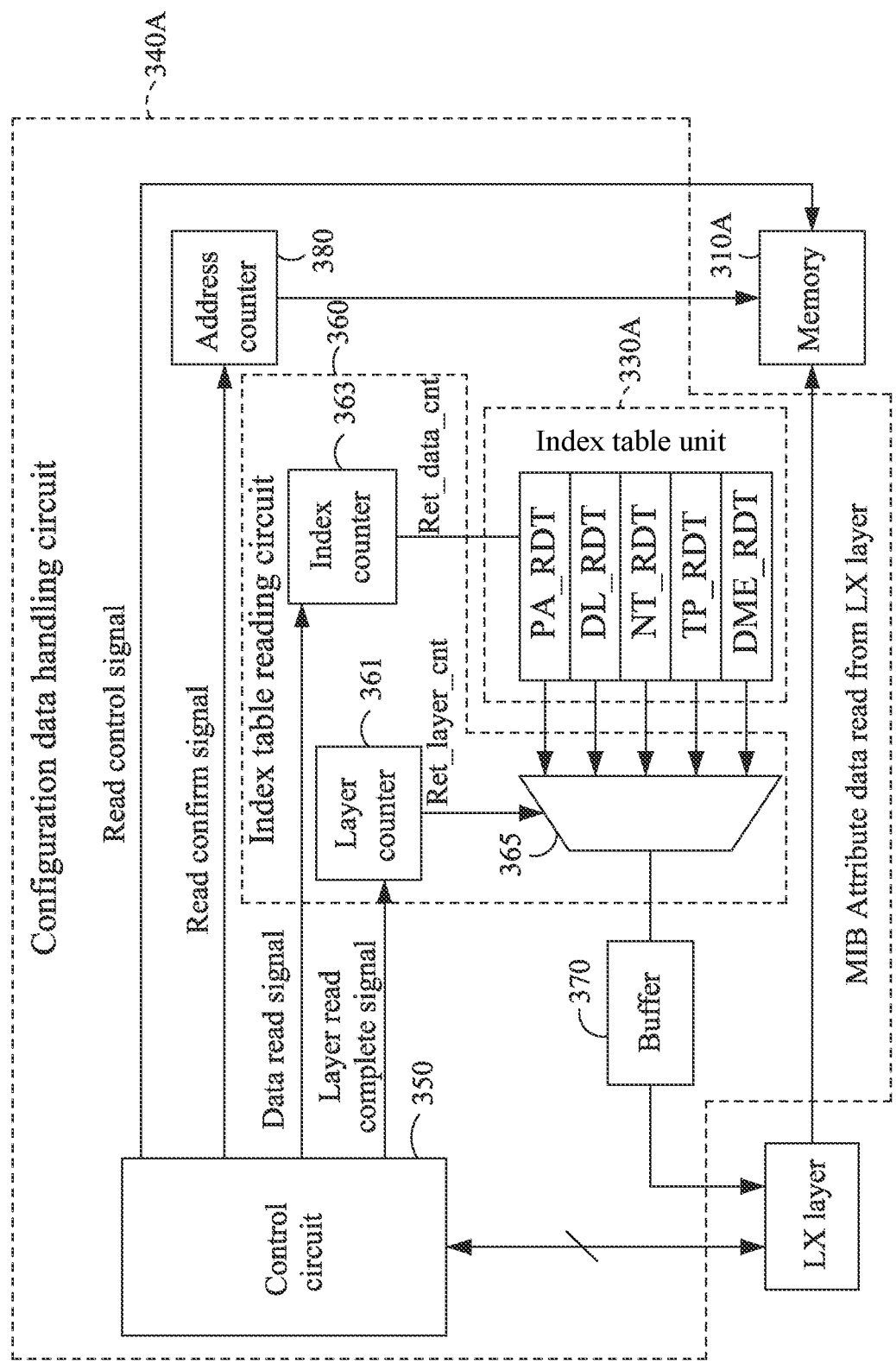
FIG. 5A is a block diagram of a circuit performing MIB attribute storing based on the circuit architecture in FIG. 3 according to an embodiment.

Refer to FIG. 5A showing a block diagram of a circuit performing MIB attribute storing based on a circuit architecture in FIG. 3 according to an embodiment. In FIG. 5A, a memory 310A, an index table unit 330A, a configuration data handling circuit 340A are respective implementations of the memory 310, the index table 330, and the configuration data handling circuit 340 in FIG. 3. The memory 310A is implemented by, for example, a static random access memory (SRAM). The index table unit 330A is used for providing an index table, which includes, for example, a plurality of layer index tables PA_RDT, DL_RDT, NT_RDT, TP_RDT, and DME_RDT. These layer index tables include respective attribute identifiers of a plurality of MIB attributes that are required to be retained hibernation for the PHY adapter layer 321, the data link layer 322, the network layer 323, the transport layer 324, and the device management entity 325. For example, the layer index table PA_RDT includes attribute identifiers of a plurality of MIB attributes of the PHY adapter layer 321 that are required to be retained during hibernation. The details of the other layers can be deduced accordingly, and will not be repeated herein. In practice, the index table unit 330A may be defined flexibly according to requirements, and the index table 330 may be implemented by various manners, for example, a look-up table or register array, or from the perspective of a hardware description language, by way of defining parameters or constants. In FIG. 5A, the configuration data handling circuit 340A includes a control circuit 350, an index table reading circuit 360, a buffer 370, and an address counter 380. The index table reading circuit 360 includes a layer counter 361, an index counter 363, and a multiplexer 365. The configuration data handling circuit 340A may be used to implement step S20 in FIG. 4A so as to perform MIB attribute storing.

Moreover, for the sake of presentation and illustration, an LX layer in FIG. 5A represents a sub-layer (for example, one of 321 to 325 in FIG. 3) in the link layer, and the LX layer has a plurality of MIB attributes required to be retained during hibernation, for example, one of the MIB attributes PA_RD, DL_RD, NT_RD, TP_RD, and DME_RD of the sub-layers in FIG. 3. In the LX layer, a memory circuit may be implemented, including, for example, a plurality of registers or appropriate memory elements, wherein the memory circuit receives an address signal corresponding to an attribute identifier of the MIB attribute and an access control signal, so as to access to the attribute data of the MIB attribute.

The device management entity 325 performs step S20 in FIG. 4A in response to a hibernation entering indication signal indicating entering a hibernation state of the interconnection protocol, such as, a primitive or a signal triggered by a hibernation entering request, so as to perform MIB attribute storing. To this end, the device management entity 325 uses the configuration data handling circuit 340A to start MIB attribute storing; examples will be given below for their operations.

The configuration data handling circuit 340A starts to read each MIB attribute required to be retained during hibernation. During the MIB attribute storing, the index table reading circuit 360 reads an attribute identifier of an MIB attribute required to be retained during hibernation corresponding to an index value (for example, starting from 0) of a layer index table (for example, one of PA_RDT, DL_RDT, NT_RDT, TP_RDT and DME_RDT) in the index table unit 330A by using a layer count value (denoted as Ret_layer_cnt) and a data count value (denoted as Ret_data_cnt), and outputs the attribute identifier to the buffer 370. In response to the attribute identifier output from the buffer 370 as an address signal and a control signal output by the control circuit 350, the LX layer outputs data corresponding to the read MIB attribute (read MIB attribute data). The configuration data handling circuit 340A outputs a corresponding data signal to the memory 310A according to the read MIB attribute data, outputs the address count value by the address counter 380 as an address signal to the memory 310A, and outputs a read control signal by the control circuit 350 as a chip enable (CE) signal to the memory 310, so as to write the MIB attribute data read from the LX layer to the memory 310A.

In order to further read a next attribute identifier, the control circuit 350 outputs a data read signal (for example, a pulse; or the signal is asserted). The index counter 363 adds the data count value (Ret_data_cnt) by 1 after receiving the data read signal. When the data count value (Ret_data_cnt) is added by 1, the index table reading circuit 360 is enabled to provide a next attribute identifier for the current layer index table.

During the MIB attribute storing, after the configuration data handing circuit 340 obtains each attribute identifier of the current layer index table according to the index table unit 330A and reads the corresponding attribute data from the LX layer, the configuration data handling circuit 340A receives a read confirm signal sent by the LX layer so as to confirm that the attribute data is read. The configuration data handling circuit 340A may obtain an address signal by generating an address count value according to the read confirm signal issued from the LX layer, wherein the address signal is sent to the memory 310A and is used as a corresponding address for writing of next attribute data read from the LX layer to the memory 310A. For example, the control circuit 350 triggers, by using the read confirm signal as a trigger signal, the address counter 380 to add the address count value by 1 (or to update to another value), as the address signal for writing of next attribute data to the memory 310A.

When the configuration data handling circuit 340A completes the operation of storing all of the MIB attribute data for one layer (that is, one of the sub-layers of the link layer), the control circuit 350 outputs a layer read complete signal (for example, a pulse; or the signal is asserted) to indicate that the attribute identifiers for a next layer are to be further read. The layer counter 361 adds the layer count value (Ret_layer_cnt) by 1 after receiving the layer read complete signal. For example, the current layer is the PHY adapter layer, and the next layer is the data link layer. When the layer count value (Ret_layer_cnt) is added by 1, the multiplexer 365 of the index table reading circuit 360 is enabled to switch to select an attribute identifier from the layer index table (for example, DL_RDT) of the data link layer. In this manner, the configuration data handling circuit 340A performs MIB attribute storing according to the examples of MIB attribute storing with respect to the attribute identifiers of a certain layer or a next attribute identifier as described previously until the operations of storing all of the MIB attributes of all of the layers are completed.

Figure 5B:
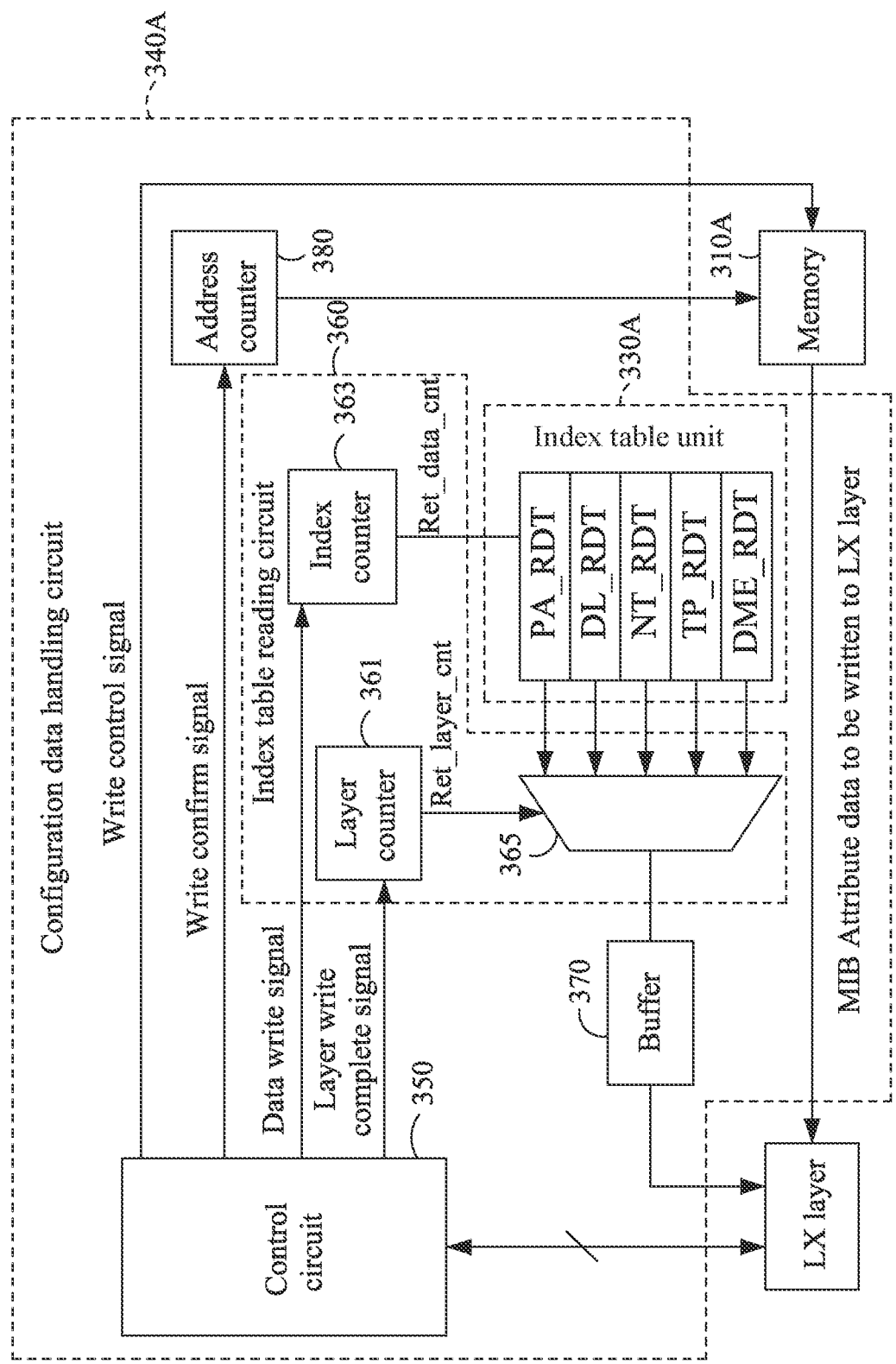
FIG. 5B is a block diagram of a circuit performing MIB attribute restoring based on the circuit architecture in FIG. 3 according to an embodiment.

Moreover, the device management entity 325 may be implemented to perform step S40 in FIG. 4C in response to a hibernation exiting indication signal indicating exiting a hibernation state of the interconnection protocol, such as, a primitive or a signal triggered by a hibernation exiting request, so as to perform MIB attribute restoring. Refer to FIG. 5B showing a block diagram of a circuit performing MIB attribute restoring based on a circuit architecture in FIG. 3 according to an embodiment. As shown in FIG. 5B, the configuration data handling circuit 340A may be further implemented to perform MIB attribute restoring; examples will be given below for their operations.

The configuration data handling circuit 340A starts to read from the memory 310A each MIB attribute required to be restored when exiting hibernation. During the MIB attribute restoring, the index table reading circuit 360 reads an attribute identifier of an MIB attribute retained during hibernation corresponding to an index value (for example, starting from 0) of a layer index table (for example, one of PA_RDT, DL_RDT, NT_RDT, TP_RDT and DME_RDT) in the index table unit 330A by using a layer count value (Ret_layer_cnt) and a data count value (Ret_data_cnt), and outputs the attribute identifier to the buffer 370. The configuration data handling circuit 340A outputs the address count value output by the address counter 380 as an address signal to the memory 310A, and outputs a write control signal by the control circuit 350 as a chip enable (CE) signal to the memory 310A, so as to output the MIB attribute data retained in the memory 310A, wherein the MIB attribute data corresponds to the attribute identifier output by the buffer 370 and is to be written to the LX layer.

In response to the attribute identifier output from the buffer 370 as an address signal and a control signal output by the control circuit 350, the LX layer writes the MIB attribute data to be written to the LX layer to the LX layer.

In order to further read a next attribute identifier, the control circuit 350 outputs a data write signal (for example, a pulse; or the signal is asserted). The index counter 363 adds the data count value (Ret_data_cnt) by 1 after receiving the data write signal. When the data count value (Ret_data_cnt) is added by 1, the index table reading circuit 360 is enabled to provide a next attribute identifier for the current layer index table.

During the MIB attribute restoring, after the configuration data handing circuit 340 obtains each attribute identifier of the current layer index table according to the index table unit 330A and writes the MIB attribute data which is output by the memory 310A and to be written to the LX layer to the LX layer, the configuration data handling circuit 340A receives a write confirm signal sent by the LX layer so as to confirm that the attribute data is written. The configuration data handling circuit 340A may generate an address signal according to the write confirm signal issued from the LX layer, and the address signal is sent to the memory 310A and used as a corresponding address for reading of next attribute data retained in the memory 310A. For example, the control circuit 350 triggers, according to the write confirm signal as a trigger signal, the address counter 380 to add the address count value by 1 (or to update to another value), as the address signal for reading of next attribute data retained in the memory 310A.

When the configuration data handling circuit 340A completes the operation of restoring all of the MIB attribute data for one layer (that is, one of the sub-layers of the link layer), the control circuit 350 outputs a layer write complete signal (for example, a pulse; or the signal is asserted) to indicate that the attribute identifier for a next layer is to be further written. The layer counter 361 adds the layer count value (Ret_layer_cnt) by 1 after receiving the layer write complete signal. For example, the current layer is the PHY adapter layer, and the next layer is the data link layer. When the layer count value (Ret_layer_cnt) is added by 1, the multiplexer 365 of the index table reading circuit 360 is enabled to switch to select an attribute identifier from the layer index table (for example, DL_RDT) of the data link layer. Thus, the configuration data handling circuit 340A performs MIB attribute restoring according to the examples of MIB attribute restoring with respect to the attribute identifiers of a certain layer or a next attribute identifier as described previously until the operations of restoring all of the MIB attributes of all of the layers are completed.

Moreover, in some embodiments, the address counter 380 may also be implemented to map to an address signal for writing of next attribute data to the memory 310A in response to a trigger signal according to the read confirm signal. In some embodiments, the address counter 380 may also be implemented to map to the address signal for reading of next attribute data retained in the memory 310A in response to a trigger signal according to the write confirm signal. In these embodiments, the mapping manner may be a function of an address count value or any appropriate mapping manner which can be used as an embodiment as long as the mapping manner is applicable for use in attribute storing and attribute restoring.

Refer to FIG. 5C showing a schematic timing diagram of the circuit in FIG. 5A or FIG. 5B. In FIG. 5C, the clock signal of the circuit in FIG. 5A or FIG. 5B is, for example, a CPort clock described in the UniPro specification adopted by the UFS standard, and represented as CP_CLK. When the MIB attribute storing is performed according to the circuit in FIG. 5A or the MIB attribute restoring is performed according to the circuit in FIG. 5B, as illustrated in FIG. 5C, the MIB attributes PA_RD, DL_RD, NT_RD, TP_RD, and DME_RD respectively represent the plurality of MIB attributes in the PHY adapter layer 321, the data link layer 322, the network layer 323, the transport layer 324, and the device management entity 325 that are required to be retained when entering a hibernation state or required to be restored when exiting a hibernation state. Correspondingly, the configuration data handling circuit 340A utilizes the layer count value (Ret_layer_cnt) and the data count value (Ret_data_cnt) to read the attribute identifier of the MIB attribute corresponding to an index value (for example, starting from 0) of a layer index table (for example, one of PA_RDT, DL_RDT, NT_RDT, TP_RDT, and DME_RDT) in the index table unit 330A. In FIG. 5C, initial values of the layer count value (Ret_layer_cnt) and the data count value (Ret_data_cnt) are 0; for example, the layer count value (Ret_layer_cnt) changes in a manner from 1, 2, 3, 4 to 5, indicating that MIB attribute storing or MIB attribute restoring is performed for the PHY adapter layer 321, the data link layer 322, the network layer 323, the transport layer 324, and the device management entity 325, respectively. For example, assuming that there is attribute data of M MIB attributes required to be stored and restored for the PHY adapter layer 321, the data count value (Ret_data_cnt) changes in a manner from 0, 1 to M−1, for instance. For example, assuming that there is attribute data of N MIB attributes required to be stored and restored for the data link layer 322, the data count value (Ret_data_cnt) changes in a manner from 0, 1 to N−1, for instance. For example, assuming that there is attribute data of 0 MIB attributes required to be stored and restored for the network layer 323, the data count value (Ret_data_cnt) changes in a manner from 0, 1 to 0-1, for instance. For example, assuming that there is attribute data of P MIB attributes required to be stored and restored for the transport layer 324, the data count value (Ret_data_cnt) changes in a manner from 0, 1 to P−1, for instance. For example, assuming that there is attribute data of Q MIB attributes required to be stored and restored for the device management entity 325, the data count value (Ret_data_cnt) changes in a manner from 0, 1 to Q−1, for instance. In the above examples, the values of M, N, O, P and Q may be determined with respect to the number of MIB attributes required to be retained during hibernation for an interconnection protocol, for example, the UniPro specification adopted by the UFS standard, or be determined further with respect to the number of a plurality of self-defined MIB attributes required to be retained during hibernation.

It should be noted that, the circuits in FIG. 5A and FIG. 5B or the timing diagram in FIG. 5C are merely examples based on the circuit architecture in FIG. 3. In some other examples, other appropriate circuits may be implemented according to FIG. 3 and FIG. 4A to FIG. 4D and other corresponding timings may be used, wherein the values of the layer count value (Ret_layer_cnt) and the data count value (Ret_data_cnt) and the sequences of change thereof may also be modified.

Figure 6A:
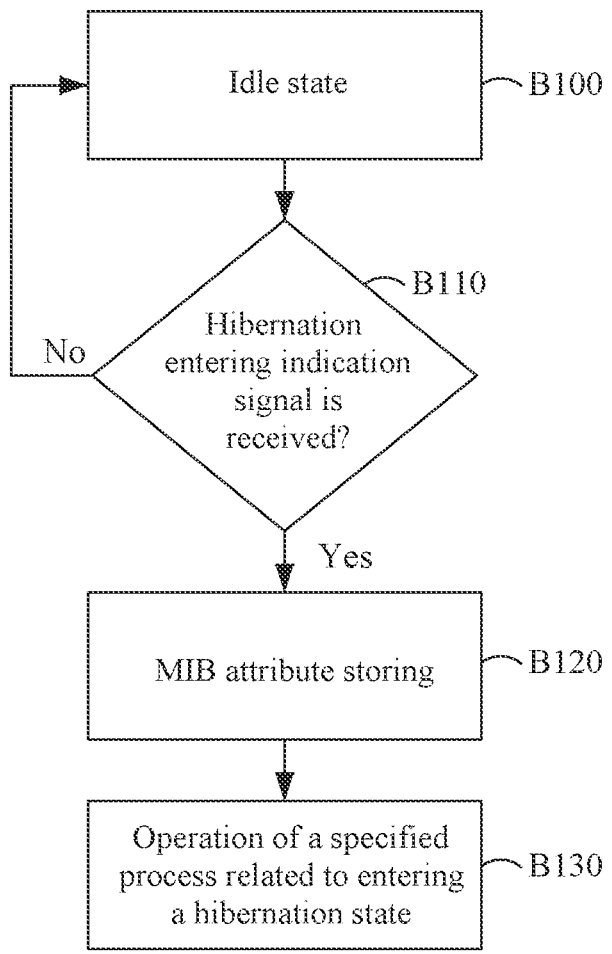
FIG. 6A is a schematic diagram of MIB attribute storing performed by the control circuit in FIG. 5A according to an embodiment.

Moreover, the control circuit 350 in FIG. 5A or FIG. 5B may be implemented by a state machine. Refer to FIG. 6A showing a schematic diagram of MIB attribute storing performed by the control circuit in FIG. 5A according to an embodiment. As shown in FIG. 6A, block B100 represents that the control circuit 350 is in an idle state. In block B110, the control circuit 350 checks whether a hibernation entering indication signal indicating entering a hibernation state is received, wherein the hibernation entering indication signal may be initiated by a peer side. If so, block B120 is performed to perform MIB attribute storing; if not, the process returns to block B100. After block B120 is performed, as shown in block B130, the operation of a specification process related to entering a hibernation state is performed.

When the MIB attribute storing of block B120 is performed, the determination for determining that the attribute storing is completed may be represented by pseudo code in TABLE 2, wherein reference may be made to the process of the embodiment shown in FIG. 5C. The pseudo code is written in, for example, a hardware description language (for example, Verilog). The pseudo code indicates that, if a read confirm signal (for example, dme_ret_cnf indicates that MIB attribute data has been read from a current layer) is received, it is continued to determine whether the value of the layer count value (Ret_layer_cnt) is 5 (for example, corresponding to DME) and whether the value of the data count value (Ret_data_cnt) is equal to DME_RET_MIB_NUM, wherein DME_RET_MIB_NUM indicates, for example, the number of MIB attributes (for example, Q of FIG. 5C) of the DME that are required to be retained during hibernation. If so, it indicates that the MIB attribute storing is completed, and the process proceeds to a next state. If the layer count value (Ret_layer_cnt) or the data count value (Ret_data_cnt) does not meet the above conditions, it is remained in the current state (for example, represented as h8enter_fsm[3:0]), and the operation of the attribute storing is continually performed.

TABLE 2

| Pseudo code (written in a hardware description language, for example) |
| --- |
| if (dme_ret_cnf) begin<br>   if (ret_layer_cnt == 3d5 && ret_data_cnt = DME_RET_MIB_NUM)<br>      h8enter_fsm_nxt = Next State;<br>   else<br>      h8enter_fsm_nxt = h8enter_fsm[3:0];<br>end<br>else<br>   h8enter_fsm_nxt = h8enterfsm[3:0]; |

Figure 6B:
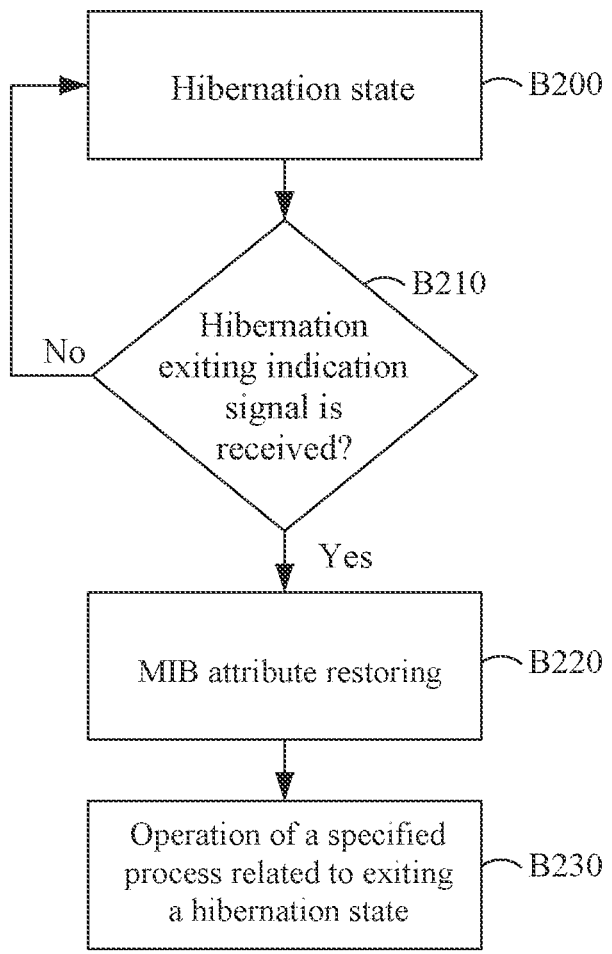
FIG. 6B is a schematic diagram of MIB attribute restoring performed by the control circuit in FIG. 5B according to an embodiment.

Refer to FIG. 6B showing a schematic diagram of MIB attribute restoring performed by the control circuit in FIG. 5A according to an embodiment. As shown in FIG. 6B, block B200 represents that the control circuit 350 is in a hibernation state. In block B210, the control circuit 350 checks whether a hibernation exiting indication signal indicating exiting a hibernation state is received, wherein the hibernation exiting indication signal may be initiated by a peer side. If so, block B220 is performed to perform MIB attribute restoring; if not, the process returns to block B200. After block B220 is performed, as shown in block B230, the operation of a specification process related to exiting a hibernation state is performed.

When the MIB restoring of block B220 is performed, the determination for determining that the attribute restoring is completed may be represented by pseudo code in TABLE 3, wherein reference may be made to the process of the embodiment shown in FIG. 5C. The pseudo code is similarly written in a hardware description language (for example, Verilog). The pseudo code indicates that, if a write confirm signal (for example, dme_ret_cnf indicates that MIB attribute data has been read from a current layer) is received, it is continued to determine whether the value of the layer count value (Ret_layer_cnt) is 5 (for example, corresponding to DME) and whether the value of the data count value (Ret_data_cnt) is equal to DME_RET_MIB_NUM. If so, it indicates that the MIB attribute restoring is completed, and the process proceeds to a next state (for example, represented by H8EXIT_PRE_EXIT_DL). If the layer count value (Ret_layer_cnt) or the data count value (Ret_data_cnt) does not meet the above conditions, it is remained in the current state (for example, represented as H8EXIT_RESTORE), and the operation of the attribute restoring is continually performed.

TABLE 3

Pseudo code (written in a hardware description language, for example)

if (dme_ret_cnf) begin
  if (ret_Iayer_cnt == 3d5 && ret_data_cnt = DME_RET_MIB_NUM)
    h8enter_fsm_nxt = H8EXIT_PRE_EXIT_DL;
  else
    h8enter_fsm_nxt = H8EXIT_RESTORE;
end
else
  h8enter_fsm_nxt = H8EXIT_RESTORE;

Moreover, as described above, the index table has implementation flexibilities; that is, order for storing or restoring different attribute data can be adjusted by way of configuring the index table, and this is beneficial for preventing errors caused by the restoring order of related attribute data. In view of the above, an order problem that may occur during MIB attribute restoring is to be described below, and how to correctly and flexibly perform MIB attribute restoring by using the index table and according to the circuit architecture of FIG. 3 is also described below.

The order problem to be discussed below relates to attributes in a device management entity, and more particular to an attribute of quality of service (QoS) function. First, the QoS function is described in brief herein. Taking the UniPro version 1.8 and the specification thereafter for example, execution of a link QoS function is provided. In a circuit implemented according to such UniPro specification, QoS records can be provided after the QoS function is enabled, wherein a value of the attribute DME_QOS_ENABLE is set to a value that is non-zero and indicates an active state. The above QoS records are, for example, a symbol count and the number of error events within a desired time window during transmission. When the number of error events has reached the threshold value, a circuit for UniPro sends an indication to notify an application layer, for example, sending a primitive DME_QOS.ind to notify the application layer of having reached the threshold value.

Moreover, according to the UniPro specification, when the QoS enable bits are set to be a value representing reset (for example, 1'b0 (represented in Verilog), that is, 0x00), a plurality of associated QoS counters are reset, wherein the QoS enable bits correspond to the attribute DME_QOS_ENABLE (with an attribute identifier being 0x5130).

Figure 7:
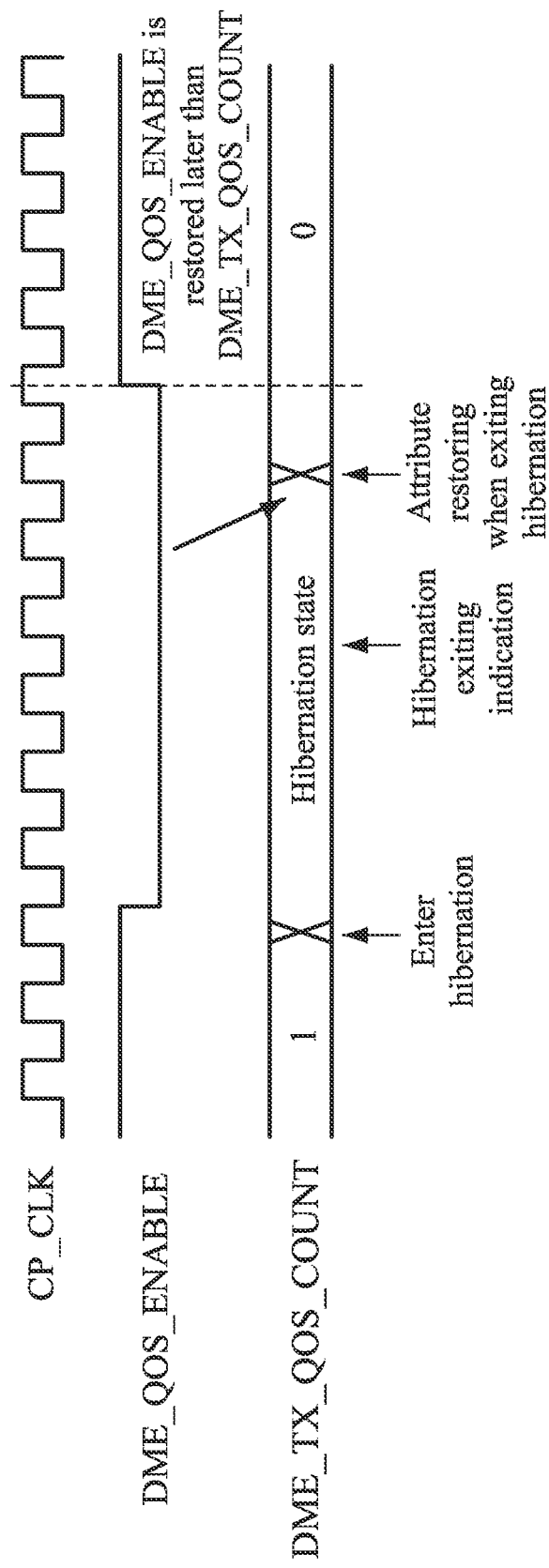
FIG. 7 is a schematic diagram illustrating a possible problem occurring during MIB attribute restoring.

On the basis of the above UniPro specification, refer to FIG. 7 showing a schematic diagram of possible problems occurring during MIB attribute restoring. During MIB attribute restoring, if the order of the attribute identifiers in an index table (for example, the example shown in TABLE 4 below) are merely based on the order of sizes of values of attribute identifiers in the UniPro specification such that a QoS counter value (for example, corresponding to an attribute DME_TX_QOS_COUNT of the QoS counter value of a transmitter) is restored earlier than the QoS enable bits (for example, corresponding to the attribute DME_QOS_ENABLE), that is, if the attribute DME_QOS_ENABLE is restored later than the attribute DME_TX_QOS_COUNT, a situation where the related MIB attributes cannot be correctly restored is resulted. As shown in FIG. 7, because the attribute DME_QOS_ENABLE has not yet restored and the attribute DME_QOS_ENABLE is still in a state of zero after a power supply is switched to be on, according to the UniPro specification, the related MIB attributes are reset and thus restored to default values defined in the UniPro specification, for example, the QoS counter value (DME_TX_QOS_COUNT is reset to 0) cannot be correctly restored to the value (for example, 1) before entering the hibernation state.

As shown in TABLE 4, if the order of the attribute identifiers in the layer index table DME_RDT is arranged merely according to the values of the attribute identifiers of the UniPro specification, the attribute DME_QOS_COUNT is arranged before the attribute DME_QOS_ENABLE, and so the situation in the example in FIG. 7 may be resulted.

TABLE 4

| Sub-layer | Attribute identifier | MIB attribute (required to be retained during hibernation) | Index value |
|---|---|---|---|
| Device management entity (DME) | 0 × 5000 | DME_DDBL1_Revision | 0 |
| | 0 × 5001 | DME_DDBL1_Level | 1 |
| | . . . | . . . | . . . |
| | 0 × 5005 | DME_DDBL1_Length | . . . |
| | 0 × 5100 | DME_TX_DATA_OFL | . . . |
| | 0 × 5101 | DME_TX_NAC_RECEIVED | . . . |
| | 0 × 5102 | DME_TX_QOS_COUNT | . . . |
| | . . . | . . . | . . . |
| | 0 × 5122 | DME_TXRX_QOS_COUNT | . . . |
| | 0 × 5122 | DME_TXRX_DL_LM_ERROR | . . . |
| | 0 × 5130 | DME_QOS_ENABLE | Q-2 |
| | 0 × 5131 | ME_QOS_STATUS | Q-1 |

Figure 8:
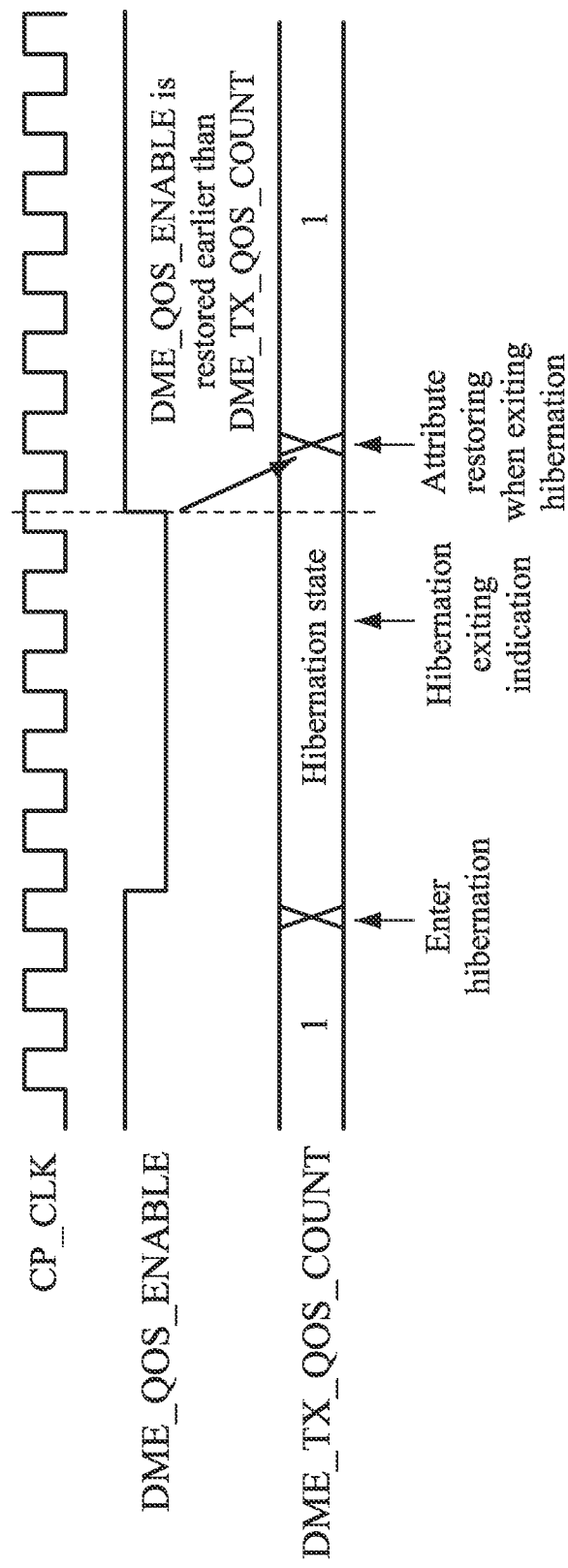
FIG. 8 is a schematic diagram illustrating that MIB attribute restoring can be correctly performed in a flexible manner based on the circuit architecture in FIG. 3.

Refer to FIG. 8 showing a schematic diagram of MIB attribute restoring that can be correctly performed in a flexible manner based on the circuit architecture in FIG. 3. As shown in FIG. 8, when MIB attribute restoring is performed according to a circuit in the circuit architecture in FIG. 3, for example, the circuit in FIG. 5B, since the index table (such as the example in TABLE 5 below) is configured such that the QoS enable bits (for example, corresponding to the attribute DME_QOS_ENABLE) are restored earlier than the QoS counter value (for example, corresponding to the attribute DME_TX_QOS_COUNT) in terms of the order of the attribute identifiers for the device management entity 325 in the index table, the related QoS attributes (for example, the attribute DME_TX_QOS_COUNT) can be correctly restored to the value before the hibernation state without incurring the above condition in FIG. 7.

The above description is given by taking a problem related to restoring attribute identifiers of the device management entity 325. However, the above configuration of the order of the index table may also be applied to other layers, for example, the PHY adapter layer 321, the data link layer 322, the network layer 323 and the transport layer 324. In case of any situation similar to that in FIG. 7 occurring in these layers, the problem may also be solved by a manner similar to that in FIG. 8 or TABLE 5. Moreover, the plurality of self-defined MIB attributes required to be retained during hibernation may also be appropriately applied by using the above manners for changing the order of the index table (for example, to be earlier or later than one or more MIB attributes) so as to produce the required function and technical effects.

The example in TABLE 5 shows a plurality of MIB attributes of the device management entity that are required to be retained during hibernation. As shown in TABLE 5, in terms of the order of the attribute identifiers for the device management entity 325, the attribute identifier (for example, 0x5130) of the QoS enable bits is arranged to be before the attribute identifier (for example, 0x5102) of the QoS counter value. As such, when MIB attribute restoring is performed by the circuit according to the circuit architecture in FIG. 3, for example, the circuit in FIG. 5B, the attribute identifier of the QoS enable bits can be read earlier from the index table than the attribute identifier of the QoS counter value; correspondingly, the QoS enable bits can be read earlier from the memory 310 and written earlier to the device management entity 325 than the QoS counter value (the QoS enable bits and the QoS counter value are both attribute data retained in the memory 310). Thus, the QoS enable bits can be restored earlier than the QoS counter value. The layer index table DME_RDT in the index table unit 330A in FIG. 5A or FIG. 5B can be implemented to include the attribute identifiers of a plurality of MIB attributes of the device management entity in TABLE 5 that are required to be retained during hibernation. Moreover, the index values may be assigned with attribute identifiers in the layer index table DME_RDT, and the index values are made to correspond to the value of the data count value (Ret_data_cnt), thereby adapting the operation in the configuration data handling circuit 340A.

TABLE 5

| Sub-layer | Attribute identifier | MIB attribute (required to be retained during hibernation) | Index value |
| --- | --- | --- | --- |
| Device management entity (DME) | 0 x 5000 | DME_DDBL1_Revision | 0 |
| | 0 x 5001 | DME_DDBL1_Level | 1 |
| | ... | ... | ... |
| | 0 x 5005 | DME_DDBL1_Length | ... |
| | 0 x 5130 | DME_QOS_ENABLE | 6 |
| | 0 x 5100 | DME_TX_DATA_OFL | ... |
| | 0 x 5101 | DME_TX_NAC_RECEIVED | ... |
| | 0 x 5102 | DME_TX_QOS_COUNT | ... |
| | ... | ... | ... |
| | 0 x 5122 | DME_TXRX_QOS_COUNT | ... |
| | 0 x 5122 | DME_TXRX_DL_LM_ERROR | ... |
| | 0 x 5131 | DME_QOS_STATUS | Q-1 |

It can be observed from the examples in FIG. 8 and TABLE 5, when MIB attribute restoring is implemented according to the circuit architecture in FIG. 3 and the related embodiments, the configuration of the order of the attribute identifiers of the plurality of MIB attributes in the index table (for example, 330 in FIG. 3; 330A in FIG. 5A or FIG. 5B) can be used to solve the problem of the example in FIG. 7. The above solution is capable of preventing the situation in FIG. 7 from occurring without involving additional logic circuits. As such, it is demonstrated that the circuit architecture in FIG. 3 and the method in FIG. 4A to FIG. 4D based on an index table have implementation flexibilities, and order for storing or restoring different attribute data can be adjusted by way of configuring the index table, and this is beneficial for preventing errors caused by the restore order of related attribute data.

Moreover, the problem in FIG. 7 may be caused if the index table is configured by the example in TABLE 4 in the above condition. However, in some other embodiments, based on the circuit in FIG. 5B and the index table in TABLE 4, the implementation of the configuration data handling circuit 340A may be further adjusted or configured with respect to the problem in FIG. 7. For example, additional logic operations (or determination circuit) can be added to have the QoS enable bits (for example, corresponding to the attribute DME_QOS_ENABLE) be restored earlier than the QoS counter value (for example, corresponding to the attribute DME_TX_QOS_COUNT), and this can be achieved by configuring the control circuit 350 and the index table reading circuit 360.

Hence, in the embodiments based on the circuit architecture in FIG. 3 (or based on the method in FIG. 4A to FIG. 4D), during a process of entering a hibernation state, the electronic device is capable of correctly, efficiently and flexibly storing attribute data that is required to be retained during hibernation. During a process of exiting the hibernation state, the electronic device is capable of correctly, efficiently and flexibly restoring the attribute data retained during hibernation according to the index table.

Moreover, in the present disclosure, the state of a signal to be "asserted" (or other alternative forms such as "asserting" or "assertion") means that a signal is set to be in an active state (or an active signal level), which may be a high or low level. The state of a signal to be "de-asserted" (or other alternative forms such as "de-asserting" or "de-assertion") means that a signal is set to be in an inactive state (or an inactive signal level), which may be a high or low level. If a signal is set to be at a low level to represent an active state (active-low), asserting the signal means that the signal is set to a low level, and de-asserting the signal means that the signal is set to a high level. If a signal is set to be at a high level to represent an active state (active-high), asserting the signal means that the signal is set to a high level, and de-asserting the signal means that the signal is set to a low level.

Moreover, in the embodiments related to the host and the storage device above, the hardware protocol engine in the host controller or the device controller can be designed based on Hardware Description Language (HDL) such as Verilog or techniques of any other design methods of digital circuits generally known to a person skilled in the art, and can be implemented by one or more of circuits based on the circuit such as a field programmable gate array (FPGA), an application-specific integrated circuit (ASIC) or a complex programmable logic device (CPLD), or be implemented by a dedicated circuit or module. The host controller or the device controller (or a processing unit or a hardware protocol engine therein) can also be implemented based on a microcontroller, a processor or a digital signal processor (DSP).

The present invention is disclosed by way of the embodiments above. A person skilled in the art should understand that, these embodiments are merely for illustrating the present invention and are not to be construed as limitations to the scope of the present invention. It should be noted that all equivalent changes, replacements and substitutions made to the embodiments are encompassed within the scope of the present invention. Therefore, the scope of legal protection of the present invention should be defined by the appended claims.

What is claimed is:
1. A method for handling configuration data for an interconnection protocol within hibernate operation, suitable for a first device capable of linking to a second device according to the interconnection protocol, the method comprising following steps:

in the first device, receiving a hibernation entering indication signal indicating entering a hibernation state of the interconnection protocol, wherein the first device has a memory and an index table, the index table includes attribute identifiers corresponding to a plurality of management information base (MIB) attributes, the MIB attributes belong to sub-layers of a link layer of the interconnection protocol and are required to be retained during hibernation; and in response to the hibernation entering indication signal, performing MIB attribute storing by a hardware protocol engine for implementing the link layer of the interconnection protocol to read, for each one of the sub-layers, attribute data from the one of the sub-layers according to corresponding attribute identifiers from the index table sequentially and to write the attribute data read from the one of the sub-layers sequentially to the memory, wherein the memory is in a first power domain and the hardware protocol engine is in a second power domain independent of the first power domain; and after the hardware protocol engine enters the hibernation state, the second power domain is in a power saving state or off while the first power domain remains on.

2. The method according to claim 1, wherein the step of performing the MIB attribute storing includes:

for each one of the sub-layers:
obtaining each of the attribute identifiers for the one of the sub-layers from the index table;
for each of the attribute identifiers for the one of the sub-layers obtained from the index table,
reading attribute data from the one of the sub-layers according to the attribute identifier for the one of the sub-layers obtained from the index table; and
writing the attribute data read from the one of the sub-layers to the memory.

3. The method according to claim 2, wherein during the MIB attribute storing, after the attribute data is read from the one of the sub-layers according to each of the attribute identifiers for the one of the sub-layers obtained from the index table, an address signal is obtained by generating an address count value according to a read confirm signal issued from the one of the sub-layers, and the address signal is sent to the memory, wherein the address signal is a corresponding address for writing of next attribute data read from the one of the sub-layers to the memory.

4. The method according to claim 1, further comprising:
in the first device, receiving a hibernation exiting indication signal indicating exiting the hibernation state of the interconnection protocol; and
in response to the hibernation exiting indication signal, performing MIB attribute restoring by the hardware protocol engine to read, for each one of the sub-layers, attribute data retained in the memory sequentially according to the corresponding attribute identifiers from the index table and to write the attribute data read from the memory sequentially to the one of the sub-layers.

5. The method according to claim 4, wherein the step of performing the MIB attribute restoring includes, for each one of the sub-layers:
obtaining each of the attribute identifiers for the one of the sub-layers from the index table;

for each of the attribute identifiers for the one of the sub-layers obtained from the index table,
reading attribute data retained in the memory according to an address signal obtained based on an address count value in response to the attribute identifier for the one of the sub-layers obtained from the index table; and
writing the attribute data read from the memory to the one of the sub-layers according to the attribute identifier for the one of the sub-layers obtained from the index table.

6. The method according to claim 5, wherein during the MIB attribute restoring, after the attribute data read from the memory is written to the one of the sub-layers according to each of the corresponding attribute identifiers for the one of the sub-layers obtained from the index table, the address count value is updated according to a write confirm signal issued from the one of the sub-layers to obtain an update of the address signal, and the update of the address signal is sent to the memory, wherein the update of the address signal is a corresponding address for reading of next attribute data retained in the memory.

7. The method according to claim 4, wherein the attribute identifiers include a first attribute identifier corresponding to Quality of Service (QoS) enable bits and a second attribute identifier corresponding to a QoS counter value; during the MIB attribute restoring performed by the hardware protocol engine, attribute data of the first attribute identifier is restored earlier than attribute data of the second attribute identifier.

8. The method according to claim 7, wherein the index table is configured to be capable of making the attribute data of the first attribute identifier read earlier than the attribute data of the second attribute identifier so that the attribute data of the first attribute identifier is restored earlier than the attribute data of the second attribute identifier.

9. The method according to claim 1, wherein the link layer is implemented according to Unified Protocol (UniPro); the sub-layers include a physical adapter layer, a data link layer, a network layer, a transport layer, and a device management entity layer; and the device management entity layer is further implemented to perform the MIB attribute storing.

10. The method according to claim 1, wherein the interconnection protocol is based on Universal Flash Storage (UFS) standard.

11. A controller for a first device that is linkable to a second device according to an interconnection protocol, the controller comprising:
a memory in a first power domain, wherein the first power domain is on in a hibernation state of the interconnection protocol;
an index table unit configured to provide an index table, wherein the index table includes attribute identifiers corresponding to a plurality of management information base (MIB) attributes, the MIB attributes belong to sub-layers of a link layer of the interconnection protocol and are required to be retained during hibernation; and
a hardware protocol engine, coupled to the memory, for implementing the link layer of the interconnection protocol, wherein in response to a hibernation entering indication signal indicating entering the hibernation state of the interconnection protocol, the hardware protocol engine further performs MIB attribute storing to read, for each one of the sub-layers, attribute data from the one of the sub-layers according to corresponding attribute identifiers from the index table sequentially and to write the attribute data read from the one of the sub-layers sequentially to the memory, wherein the hardware protocol engine is in a second power domain independent of the first power domain; and after the hardware protocol engine enters the hibernation state, the second power domain is in a power saving state or off while the first power domain remains on.

12. The controller according to claim 11, wherein the hardware protocol engine performs the MIB attribute storing by a plurality of operations including:
for each one of the sub-layers:
obtaining each of the attribute identifiers for the one of the sub-layers from the index table;
for each of the attribute identifiers for the one of the sub-layers obtained from the index table,
reading attribute data from the one of the sub-layers according to the attribute identifier for the one of the sub-layers obtained from the index table; and
writing the attribute data read from the one of the sub-layers to the memory.

13. The controller according to claim 12, wherein during the MIB attribute storing, after the attribute data is read from the one of the sub-layers according to each of the attribute identifiers for the one of the sub-layers obtained from the index table, the hardware protocol engine further obtains an address signal based on an address count value which is generated according to a read confirm signal issued from the one of the sub-layers and sends the address signal to the memory, wherein the address signal is a corresponding address for writing of next attribute data read from the one of the sub-layers to the memory.

14. The controller according to claim 11, wherein in response to a hibernation exiting indication signal indicating exiting the hibernation state of the interconnection protocol, the hardware protocol engine further performs MIB attribute restoring to read, for each one of the sub-layers, attribute data retained in the memory sequentially according to the corresponding attribute identifiers from the index table and to write the attribute data read from the memory sequentially to the one of the sub-layers.

15. The controller according to claim 14, wherein the hardware protocol engine performs the MIB attribute restoring by a plurality of operations including:
for each one of the sub-layers:
obtaining each of the attribute identifiers for the one of the sub-layers from the index table;
for each of the attribute identifiers for the one of the sub-layers obtained from the index table,
reading attribute data retained in the memory according to an address signal obtained based on an address count value in response to the attribute identifier for the one of the sub-layers obtained from the index table; and
writing the attribute data read from the memory to the one of the sub-layers according to the attribute identifier for the one of the sub-layers obtained from the index table.

16. The controller according to claim 15, wherein during the MIB attribute restoring, after the attribute data read from the memory is written to the one of the sub-layers according to each of the corresponding attribute identifiers for the one of the sub-layers obtained from the index table, the hardware protocol engine updates the address count value according to a write confirm signal issued from the one of the sub-layers to obtain an update of the address signal, and sends the update of the address signal to the memory, wherein the update of the address signal is a corresponding address for reading of next attribute data retained in the memory.

17. The controller according to claim 14, wherein the attribute identifiers include a first attribute identifier corresponding to Quality of Service (QoS) enable bits and a second attribute identifier corresponding to a QoS counter value; the hardware protocol engine is capable of, during the MIB attribute restoring, making attribute data of the first attribute identifier restored earlier than attribute data of the second attribute identifier.

18. The controller according to claim 17, wherein the index table is configured to be capable of making the attribute data of the first attribute identifier read earlier than the attribute data of the second attribute identifier so that the attribute data of the first attribute identifier is restored earlier than the attribute data of the second attribute identifier.

19. The controller according to claim 11, wherein the link layer is implemented according to Unified Protocol (UniPro); the sub-layers include a physical adapter layer, a data link layer, a network layer, a transport layer, and a device management entity layer; and the device management entity layer is further implemented to perform the MIB attribute storing.

20. The controller according to claim 11, wherein the interconnection protocol is based on Universal Flash Storage (UFS) standard.

21. An electronic device, operable to link to another electronic device according to an interconnection protocol, the electronic device comprising:
an interface circuit for implementing a physical layer of the interconnection protocol to link to the another electronic device;
a memory in a first power domain, wherein the first power domain is on in a hibernation state of the interconnection protocol;
an index table unit configured to provide an index table, wherein the index table includes attribute identifiers corresponding to a plurality of management information base (MIB) attributes, the MIB attributes belong to sub-layers of a link layer of the interconnection protocol and are required to be retained during hibernation; and
a hardware protocol engine, coupled to the interface circuit and the memory, for implementing the link layer of the interconnection protocol, wherein in response to a hibernation entering indication signal indicating entering the hibernation state of the interconnection protocol, the hardware protocol engine further performs MIB attribute storing to read, for each one of the sub-layers, attribute data from the one of the sub-layers according to corresponding attribute identifiers from the index table sequentially and to write the attribute data read from the one of the sub-layers sequentially to the memory, wherein the hardware protocol engine is in a second power domain independent of the first power domain; and after the hardware protocol engine enters the hibernation state, the second power domain is in a power saving state or off while the first power domain remains on.

22. The electronic device according to claim 21, wherein in response to a hibernation exiting indication signal indicating exiting the hibernation state of the interconnection protocol, the hardware protocol engine further performs MIB attribute restoring to read, for each one of the sub-layers, attribute data retained in the memory sequentially according to the corresponding attribute identifiers from the index table and to write the attribute data read from the memory sequentially to the one of the sub-layers.

23. The electronic device according to claim 22, wherein the attribute identifiers include a first attribute identifier corresponding to Quality of Service (QoS) enable bits and a second attribute identifier corresponding to a QoS counter value; the hardware protocol engine is capable of, during the MIB attribute restoring, making attribute data of the first attribute identifier restored earlier than attribute data of the second attribute identifier.

24. The electronic device according to claim 23, wherein the index table is configured to be capable of making the attribute data of the first attribute identifier read earlier than the attribute data of the second attribute identifier so that the attribute data of the first attribute identifier is restored earlier than the attribute data of the second attribute identifier.

25. The electronic device according to claim 21, wherein the link layer is implemented according to Unified Protocol (UniPro); the sub-layers include a physical adapter layer, a data link layer, a network layer, a transport layer, and a device management entity layer; and the device management entity layer is further implemented to perform the MIB attribute storing.

26. The electronic device according to claim 21, wherein the interconnection protocol is based on Universal Flash Storage (UFS) standard.

* * * * *